(12) United States Patent
Jaipaul et al.

(10) Patent No.: US 10,059,576 B2
(45) Date of Patent: Aug. 28, 2018

(54) WIRELESS VEHICLE LIFT SYSTEM WITH ENHANCED ELECTRONIC CONTROLS

(71) Applicant: Gray Manufacturing Company, Inc., St. Joseph, MO (US)

(72) Inventors: Larry M. Jaipaul, Clarence, NY (US); John E. Fagan, Norman, OK (US); David Dwight Sandmann, Oklahoma City, OK (US); William R. Keck, Jr., Fillmore, MO (US); Stephen J. Rucker, Savannah, MO (US); Ralph S. McKee, St. Joseph, MO (US)

(73) Assignee: Gray Manufacturing Company, Inc., St. Joseph, MO (US)

( * ) Notice: Subject to any disclaimer, the term of this patent is extended or adjusted under 35 U.S.C. 154(b) by 355 days.

(21) Appl. No.: 15/166,884

(22) Filed: May 27, 2016

(65) Prior Publication Data

US 2016/0272472 A1 Sep. 22, 2016

Related U.S. Application Data

(63) Continuation of application No. 13/835,569, filed on Mar. 15, 2013, now Pat. No. 9,352,944.

(60) Provisional application No. 61/612,795, filed on Mar. 19, 2012, provisional application No. 61/697,406, filed on Sep. 6, 2012.

(51) Int. Cl.
| | |
|---|---|
| *B66B 7/10* | (2006.01) |
| *B66F 13/00* | (2006.01) |
| *B66F 7/28* | (2006.01) |
| *B66F 3/46* | (2006.01) |
| *B66F 7/10* | (2006.01) |
| *B66F 5/00* | (2006.01) |
| *H04B 7/24* | (2006.01) |

(52) U.S. Cl.
CPC .............. *B66F 13/00* (2013.01); *B66F 3/46* (2013.01); *B66F 5/00* (2013.01); *B66F 7/10* (2013.01); *B66F 7/28* (2013.01); *H04B 7/24* (2013.01)

(58) Field of Classification Search
CPC ...... B06F 7/10; B06F 3/46; B06F 7/26; B06F 7/28; B06F 13/00; B06F 5/00; H04B 7/24
USPC ....... 187/203, 204, 207, 209, 210, 213, 219, 187/220, 247, 277, 391–394
See application file for complete search history.

(56) References Cited

U.S. PATENT DOCUMENTS

| | | |
|---|---|---|
| 1,477,790 A | 12/1923 | Townsend |
| 3,757,895 A | 9/1973 | Knutson |

(Continued)

FOREIGN PATENT DOCUMENTS

| | | |
|---|---|---|
| CA | 2714047 A1 | 1/2014 |
| DE | 2649769 | 5/1978 |

(Continued)

OTHER PUBLICATIONS

The EVJ "Under-the-Hoist" Jack, published by Meyer Hydraulics Corporation, dated 1997.

(Continued)

*Primary Examiner* — Anthony Salata
(74) *Attorney, Agent, or Firm* — Hovey Williams LLP

(57) ABSTRACT

Wireless portable vehicle lift system incorporating one or more enhanced communication and/or control features. The lift system can incorporate enhanced touch screen-enabled functionalities and/or enhanced wireless communication features.

45 Claims, 20 Drawing Sheets

(56) References Cited

U.S. PATENT DOCUMENTS

| | | | |
|---|---|---|---|
| 3,958,664 A | 5/1976 | Perkins | |
| 4,131,263 A | 12/1978 | John | |
| 4,141,526 A | 2/1979 | John | |
| D252,324 S | 7/1979 | John | |
| 4,173,268 A | 11/1979 | Nussbaum | |
| 4,187,927 A | 2/1980 | Byrne | |
| 4,230,196 A | 10/1980 | Snead | |
| 4,245,808 A | 1/1981 | John | |
| 4,252,217 A | 2/1981 | Benjamin | |
| 4,334,667 A | 6/1982 | Fox | |
| 4,573,663 A | 3/1986 | Nussbaum | |
| 4,739,492 A | 4/1988 | Cochran | |
| 4,746,133 A | 5/1988 | Hanser et al. | |
| 4,777,798 A | 10/1988 | Jacobson et al. | |
| 5,040,178 A | 8/1991 | Lindsay | |
| 5,176,225 A | 1/1993 | Nussbaum | |
| 5,180,131 A | 1/1993 | Few | |
| 5,197,311 A | 3/1993 | Clark | |
| D334,879 S | 4/1993 | Few | |
| 5,205,586 A | 4/1993 | Tallman | |
| 5,284,321 A | 2/1994 | Meyer | |
| 5,299,658 A | 4/1994 | Cox et al. | |
| D347,955 S | 6/1994 | Leftwich | |
| 5,330,315 A | 7/1994 | Beattie et al. | |
| D349,801 S | 8/1994 | Few et al. | |
| D350,055 S | 8/1994 | Few | |
| 5,335,755 A | 8/1994 | Miller | |
| 5,348,330 A | 9/1994 | Few et al. | |
| 5,410,894 A | 5/1995 | Fox et al. | |
| 5,418,913 A | 5/1995 | Fujimoto | |
| 5,435,523 A | 7/1995 | Hying et al. | |
| 5,444,199 A | 8/1995 | Burchard et al. | |
| 5,484,134 A | 1/1996 | Francis | |
| 5,500,691 A | 3/1996 | Martin et al. | |
| 5,501,428 A | 3/1996 | Garceau | |
| 5,518,220 A | 5/1996 | Bertrand et al. | |
| 5,540,554 A | 7/1996 | Masuzawa | |
| 5,560,033 A | 9/1996 | Doherty | |
| 5,575,605 A | 11/1996 | Fisher | |
| D376,715 S | 12/1996 | Few | |
| 5,613,418 A | 3/1997 | Guido | |
| 5,638,387 A | 6/1997 | Palleggi et al. | |
| 5,649,422 A | 7/1997 | Baginski et al. | |
| 5,676,385 A | 10/1997 | Schneider et al. | |
| 5,800,114 A | 7/1998 | Secondi | |
| 5,901,980 A | 5/1999 | Few et al. | |
| 5,911,408 A | 6/1999 | Berands et al. | |
| 5,975,496 A | 11/1999 | Hong et al. | |
| 5,975,497 A | 11/1999 | Few et al. | |
| 6,050,573 A | 4/2000 | Kunz | |
| D431,707 S | 10/2000 | Few | |
| 6,135,422 A | 10/2000 | Thomas | |
| 6,182,798 B1 | 2/2001 | Brady et al. | |
| 6,189,432 B1 | 2/2001 | Colarelli et al. | |
| 6,193,219 B1 | 2/2001 | Belley et al. | |
| 6,232,735 B1 | 5/2001 | Baba et al. | |
| 6,237,953 B1 | 5/2001 | Farmer | |
| 6,254,054 B1 | 7/2001 | Few | |
| 6,315,079 B1 | 11/2001 | Berends et al. | |
| 6,505,815 B1 | 1/2003 | Delamore | |
| 6,634,461 B1 | 10/2003 | Baker | |
| 6,763,916 B2 | 7/2004 | Green et al. | |
| 6,817,449 B2 | 11/2004 | Berends | |
| 6,964,322 B2 | 11/2005 | Green et al. | |
| 6,968,963 B1 | 11/2005 | Zakula et al. | |
| 6,983,196 B2 | 1/2006 | Green et al. | |
| 7,014,012 B2 | 3/2006 | Baker | |
| 7,191,038 B2 | 3/2007 | Green et al. | |
| 7,219,770 B2 | 5/2007 | Baker | |
| 7,500,816 B2 | 3/2009 | Berends et al. | |
| 7,644,807 B2 | 1/2010 | Finkbeiner | |
| 7,740,109 B2 | 6/2010 | Moller et al. | |
| RE41,554 E | 8/2010 | Baker | |
| 8,083,034 B2 | 12/2011 | Bordwell et al. | |
| 8,251,184 B2 | 8/2012 | De Jong et al. | |
| 9,593,000 B2 * | 3/2017 | Jaipaul | B66F 3/46 |
| 9,611,128 B2 * | 4/2017 | Van Houten | B66F 3/46 |
| 9,656,843 B2 * | 5/2017 | Jaipaul | B66F 3/46 |
| 9,679,421 B2 * | 6/2017 | Jaipaul | G07C 5/08 |
| 9,884,751 B2 * | 2/2018 | Jaipaul | B66F 3/46 |
| 9,908,764 B2 * | 3/2018 | Elliott | B66F 13/00 |
| 2002/0100901 A1 | 8/2002 | Topelbert et al. | |
| 2002/0111712 A1 | 8/2002 | Peshkin et al. | |
| 2002/0195593 A1 | 12/2002 | Ardrey, Jr. et al. | |
| 2004/0193884 A1 | 9/2004 | Molaro et al. | |
| 2004/0200644 A1 | 10/2004 | Paine et al. | |
| 2005/0098387 A1 | 5/2005 | Penn et al. | |
| 2005/0102061 A1 | 5/2005 | Lent | |
| 2006/0102432 A1 | 5/2006 | Matsumoto | |
| 2006/0285959 A1 | 12/2006 | Warhurst | |
| 2007/0205405 A1 | 9/2007 | Stockmaster et al. | |
| 2007/0294601 A1 | 12/2007 | Chitsaz et al. | |
| 2008/0071429 A1 | 3/2008 | Kraimer et al. | |
| 2008/0154712 A1 | 6/2008 | Wellman | |
| 2008/0277204 A1 | 11/2008 | Moller et al. | |
| 2009/0096606 A1 | 4/2009 | Janov et al. | |
| 2009/0236183 A1 | 9/2009 | Bordwell et al. | |
| 2009/0240402 A1 | 9/2009 | Lugash et al. | |
| 2009/0242333 A1 | 10/2009 | Finkbeiner | |
| 2009/0257396 A1 | 10/2009 | Eliezer et al. | |
| 2010/0066278 A1 | 3/2010 | DeJong | |
| 2011/0037041 A1 | 2/2011 | DeJong et al. | |
| 2011/0062399 A1 | 3/2011 | Kooima et al. | |
| 2011/0097187 A1 | 4/2011 | Kelley et al. | |
| 2011/0262255 A1 | 10/2011 | Defrancq | |
| 2012/0018688 A1 | 1/2012 | Finkbeiner | |
| 2012/0032126 A1 | 2/2012 | Finkbeiner | |
| 2012/0037864 A1 | 2/2012 | Finkbeiner et al. | |
| 2013/0240812 A1 | 9/2013 | Helmich | |
| 2015/0232309 A1 | 8/2015 | Jaipaul et al. | |
| 2015/0232310 A1 | 8/2015 | Jaipaul | |
| 2015/0246797 A1 | 9/2015 | Jaipaul et al. | |

FOREIGN PATENT DOCUMENTS

| | | |
|---|---|---|
| DE | 4242705 | 6/1994 |
| DE | 4312771 | 11/1994 |
| DE | 4330099 | 3/1995 |
| DE | 29615428 | 1/1997 |
| DE | 29700687 | 3/1997 |
| DE | 19600791 | 7/1997 |
| DE | 4401314 | 8/1998 |
| DE | 19731345 | 1/1999 |
| DE | 29916254 | 4/2000 |
| DE | 4409550 | 8/2000 |
| EP | 0296151 | 7/1987 |
| EP | 0263262 | 4/1988 |
| EP | 0568938 | 4/1993 |
| EP | 0669281 | 7/1997 |
| EP | 0893391 | 4/1998 |
| EP | 0860395 | 8/1998 |
| FR | 2717456 | 3/1994 |
| WO | 92/19527 | 11/1992 |
| WO | 98/30488 | 7/1998 |
| WO | 98/31183 | 7/1998 |
| WO | 2001/064574 A1 | 9/2001 |

OTHER PUBLICATIONS

Under Hoist Jack for Automotive and HD Truck Use, published by Norco Professional Lifting Equipment, dated Jan. 2000.

Ivashkov et al.; New Developments in Electrical Actuators for Post Brakes and Electrical Devices for Material-Handling Equipment; published in Russian Journal of Heavy Machinery, No. 12, pp. 6-10, dated 1995.

Babic et al., Microprocessor-Based Control Device for Lifts and Other Transport Systems Plants, published in EDPE, 1994, Pula, Croatia, pp. 261-264, dated Sep. 12-14, 1994.

Kingsley, Electric Steering Drives Replace Hydraulic Units; published in Power Transmission Design, pp. 57-59, dated Aug. 1994.

Chicoine et al., Design of a Battery Powered Skik-Steer Loader, published in SAE Technical Paper Series 851516, pp. 1-6, dated Sep. 9-12, 1958.

(56) References Cited

OTHER PUBLICATIONS

Schneider, Motor-Pumps (Innovations), published in Hydraulics & Pneumatics, vol. 55, No. 1, dated Jan. 1, 2002, 1 page.
Lift Tables (Southworth Products Corp.) (Brief Article), published in American Printer, vol. 225, No. 1, dated Apr. 1, 2000, 1 page.
Walk-Behind Floor Crane, (Brief Article), published in IIE Solutions, vol. 32, No. 8, dated Aug. 1, 2000, 1 page.
Stertil Koni Carlifts, "Stertil Mobile Column Lifts Manual No. ST 1072", Jan. 3, 1999.

* cited by examiner

WIRELESS VEHICLE LIFT SYSTEM WITH ENHANCED ELECTRONIC CONTROLS

CROSS-REFERENCE TO RELATED APPLICATIONS

This application claims priority to U.S. patent application Ser. No. 13/835,569, filed Mar. 15, 2013, which claims priority to U.S. Provisional Patent Application Ser. No. 61/697,406, filed Sep. 6, 2012, and U.S. Provisional Patent Application Ser. No. 61/612,795, filed Mar. 19, 2012. The entire disclosures of all these patent applications are incorporated herein by reference to the extent they do not contradict statements contained herein.

BACKGROUND

1. Field of the Invention

The present invention relates generally to portable vehicle lifts. More particularly, the invention concerns wireless portable vehicle lift systems.

2. Description of the Prior Art

The need to lift a vehicle from the ground for service work is well established. For instance, it is often necessary to lift a vehicle for tire rotation or replacement, steering alignment, oil changes, brake inspections, exhaust work, and other automotive maintenance. Traditionally, lifting a vehicle has been accomplished through the use of equipment that is built-into the service facility, such as either lift units with the hydraulic actuator(s) installed below the surface of the floor or two and four post type lift systems installed on the floor surface. These built-in units are located at a fixed location at the service facility and adapted to engage the vehicle frame to lift the vehicle from the ground. However, built-in units tend to be relatively expensive and are sometimes not as useful as they might otherwise be due to their immobility.

In an effort to increase the versatility and mobility of lift devices and reduce the need to invest in permanently mounted lifting equipment, devices commonly known as a mobile column lifts (MCL's) have been developed. Traditional MCL's use a number connecting lines or wires to provide electrical power and/or communication of the MCL's. The lines or wires that are connected between the MCL's allow the vehicle to be raised or lowered in a coordinated synchronous fashion. However, the lines and wires used to connect the MCL's extend across and are looped within the working area. The presence of these wires and lines in the work area poses a hazard to people working near the vehicle, and the connecting lines may be damaged by vehicles driving over them.

An apparatus for lifting a vehicle using multiple MCL's is described in U.S. Pat. No. 6,634,461, the entire disclosure of which is incorporated herein by reference. The lifting devices disclosed in the '461 patent are coordinated by wireless signals, such as radio frequency (RF) signals, and powered by rechargeable batteries in each lift unit. By these means, the lifting devices of the '461 patent eliminate the need for both power cables and control cables.

Although the lifts system disclosed in the '461 patent represented a significant advancement in the field of portable vehicle lifts, efforts to improve lift safety, reliability, efficiency, ease of operation, and cost effectiveness continue.

SUMMARY OF THE INVENTION

In one embodiment of the present invention, there is provided a wireless mobile column lift system comprising at least two portable lifts and an electronic control system for controlling the lift system. Each of the lifts includes (a) a base for supporting the lift on a floor or the ground; (b) a post rigidly coupled to the base and extending upwardly therefrom; (c) a carriage assembly configured to engage a wheel of a vehicle, wherein the carriage assembly is coupled to said post and configured for vertical shifting relative to the post; (d) a lift actuator for raising and lowering said carriage assembly relative to the post; and (e) one or more batteries configured to provide power for the lift. The electronic control system includes a wireless communication system configured to provide wireless communication among the lifts in the lift system and a user interface associated with each of the lifts. The user interface on each of the lifts comprises a touch screen display. The wireless communication system is configured to automatically scan communication frequencies and select a frequency with minimal noise. The electronic control system is configured to provide continuous wireless communication between each of the lifts and every other one of the lifts in the lift system. The user interface further comprises one or more function buttons separate from the touch screen display. The electronic control system is configured to permit all of the lifts to be controlled via a single user interface located on one of the lifts. The touch screen display is configured to display a real time animation of the position of the lifts during lifting and lowering. The touch screen display is configured to display the height of each of the lifts in the lift system, the weight supported by the lifts, and the battery status of the lift. The electronic control system is configured to track and/or store lift data relevant to safety, maintenance, and/or proper operation of the lift system. The electronic control system is configured to provide a notification of maintenance needs base on the lift data.

In another embodiment of the present invention, there is provided a wireless mobile column lift system comprising at least two portable lifts and an electronic control system for controlling the lift system. Each of the lifts includes (a) a base for supporting the lift on a floor or the ground; (b) a post rigidly coupled to the base and extending upwardly therefrom; (c) a carriage assembly configured to engage a wheel of a vehicle, wherein the carriage assembly is coupled to the post and configured for vertical shifting relative to the post; (d) a lift actuator for raising and lowering the carriage assembly relative to the post; and (e) one or more batteries configured to provide power for the lift. The electronic control system includes a wireless communication system configured to provide wireless communication among the lifts in the lift system and a user interface associated with each of the lifts. The user interface on each of the lifts comprises a touch screen display. The wireless communication system is configured to automatically scan communication frequencies on a continual basis and automatically adjust one or more wireless communication parameters based on the scan of communication frequencies. The electronic control system is configured such that each lift is capable of tracking its own actions and the actions of all other lifts in the lift system. The touch screen display is configured to prompt the operator of the lift system to enter a pass code prior to operating the lift system. The electronic control system is configured to access a database containing one or more stored authorized pass codes. The electronic control system is configured to render the lift system inoperable if the pass code entered by the operator does not match one of the authorized stored pass codes stored in said database. The user interface further comprises one or more function buttons separate from the touch screen display. The electronic control system is programmed so that movement of the lifts requires operator input from at least one of the function buttons. The user interface comprises an emergency stop button separate from the touch screen display. The the electronic control system is configured to permit all of said lifts to be controlled via a single user interface located on one of the lifts. Each of the lifts in the lift system is substantially identical. The touch screen display is configured to display a real time animation of the position of the lifts during lifting and lowering, the height of one or more of the lifts in the lift system, the weight supported by one or more of the lifts in the lift system, and the battery status of one or more of the lifts in the lift system. The electronic control system is configured to provide a notification of maintenance needs. The electronic control system is configured to permit paired operation of a selected pair of the lifts. Each of the lifts comprises a mechanical load holding device and the touch screen display is configured to display information about the mechanical load holding devices.

DETAILED DESCRIPTION OF THE PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
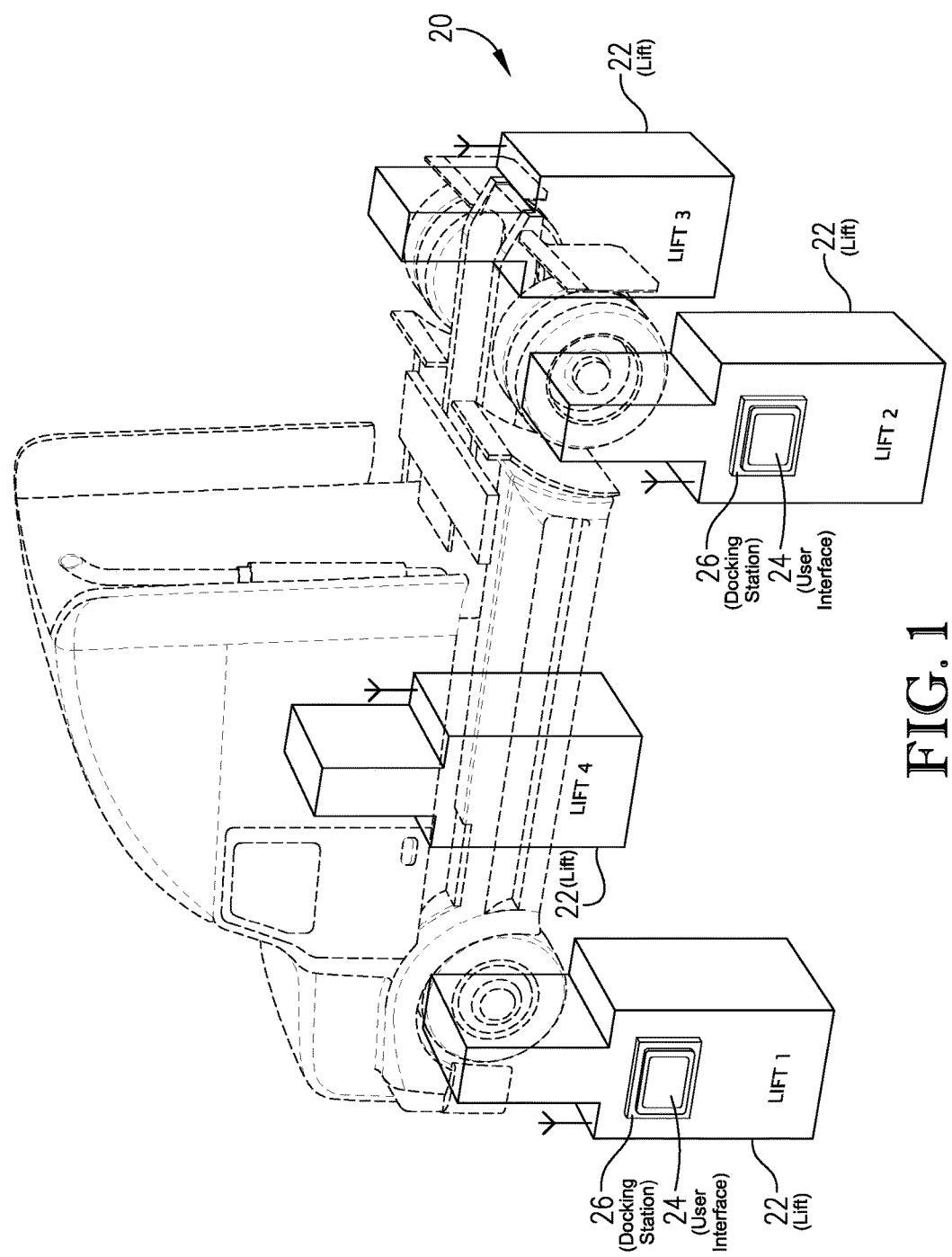
FIG. 1 is a simplified representation of a wireless portable lift system utilizing four individual lifts to perform a coordinated lift of a vehicle, where one or more of the lifts is equipped with a user interface that is readily detachable from the lift.

Referring now to the drawings in detail, and initially to FIG. 1, numeral 20 generally designates a wireless portable vehicle lift system having four individual lifts 22. Although FIG. 1 depicts a four lift system, it should be understood that any combination of two or more lifts can be used. For example, the lift system 20 can employ two, four, six, or eight individual lifts 22. In certain embodiments, each of the portable lifts 22 is substantially identical. It should also be understood that lift system 20 is not limited for use with vehicles, but also may be used to raise or lower other objects relative to a floor or ground surface, such as aircraft, industrial machinery, shipping containers, construction subassemblies, and the like.

The wireless portable vehicle lift system 20 depicted in FIG. 1 can be equipped with an electronic control system that controls the lifts 22 in response to operator commands. The electronic control system can include a wireless communication system that wirelessly communicates lift control signals to, from, and/or among the lifts 22.

As shown in FIG. 1, of the individual lifts 22 of the lift system 20 can be equipped with a user interface 24 that, after initial set-up of the lift system 20, permits the entire lift system to be controlled via a single user interface 24. As discussed in detail below, the user interface 24 can include a touch screen display that enables enhanced operating features of the lift system 20. For example, when the user interface 24 includes a touch screen display, the touch screen display can be programmed to display a real time animation of the lift positions and/or the vehicle position as the vehicle is lifted and/or lowered by the lift system 20.

In certain embodiments of the present invention, the user interface 24 can include a remote control module that can be readily detached from the lift 22 and used to wirelessly control the lift system 20, while the lift operator stands away from the lift system 20. The remote control module can have a touch screen display incorporated therein. When the user interface 24 includes a remote control module, each lift 22 can be equipped with a docking station 26 that allows the remote control module to be removably attached to the lift 22. The docking station 26 can be configured to allow for easy physical connection and disconnection of the remote control module to and from the lift 22. Further, the docking station 26 can be configured to allow for easy electrical connection and disconnection of the remote control module to and from the lift 22. The electrical connection between the remote control module and the lift 22 can permit wired communication between the remote control module and the lift 22 when the remote control module is received in the docking station. Thus, the remote control module can be used to control the lift system 20 whether it is attached to or detached from the lift 22. The lift 22 can be equipped with a charger for charging a battery of the remote control module when the remote control module is received on the docking station 26.

In certain embodiments, the user interface 24 can employ a remote control module equipped with wireless communication capability and multimedia functionality. Examples of such remote control modules include portable electronic devices such as notebook computers, tablet computers, PDAs, and smart phones. In certain embodiments, both the remote control module and each lift 22 can be capable of independently accessing the internet, so that the remote control module can control the lift system 20 via the internet.

When the remote control module has both wireless communication capability and multimedia functionality, the remote control module can be used to not only wirelessly control the lifts 22, but also to contact the lift manufacture or service provider for technical support and/or training. The wireless communication between the remote control module and the lift manufacture or service provider can be accomplished via satellite, the internet and/or via a cellular phone network.

To facilitate communication between the operator of the lift system 20 and the entity providing technical support or training, the remote control module can be equipped with a camera, a microphone, and/or a keyboard. The camera can be a still camera or a video camera that allows the operator of the lift system 20 to transmit images or video of the lift system 20 and/or the environment around the lift system to the entity providing technical support or training. The microphone allows the operator of the lift system 20 to verbally communicate with personnel at the technical support or training entity using the remote control module. When the remote control module is equipped with a video camera and a microphone, technical support and/or training can be facilitated via video conference. The keyboard on the remote control module can permit communication between the operator of the lift system 20 and the technical support or training entity via textual messaging. In certain embodiment, the user interface 24 can also include a voice activated command module.

When the lift system 20 is equipped with wireless internet capability (via a remote control module or otherwise), technical support or training can be greatly enhanced. In addition to the technical support and training features described above, support can also be provided in the form of remote diagnostics, remote troubleshooting of lift problems, and remote tracking and/or storing of lift information. Lift information tracked and/or stored can included any lift data that may be relevant to the safety, maintenance, and/or proper operation of the lift system 20. This lift data can be regularly gathered and stored for use in diagnosing lift problems, notifying lift owners of maintenance needs, and/or warning lift owners of improper lift operation.

In certain embodiments of the present invention, the electronic control system comprises a distributed wireless server network configured to collect operational and maintenance data about the lift system. The distributed wireless server network can be capable of being remotely accessed by owners, operators, and/or manufactures of the lift so as to provide real time data to remote parties. Such real time data can include operational status, lift operational data, and/or lift diagnostics data.

Figure 2:
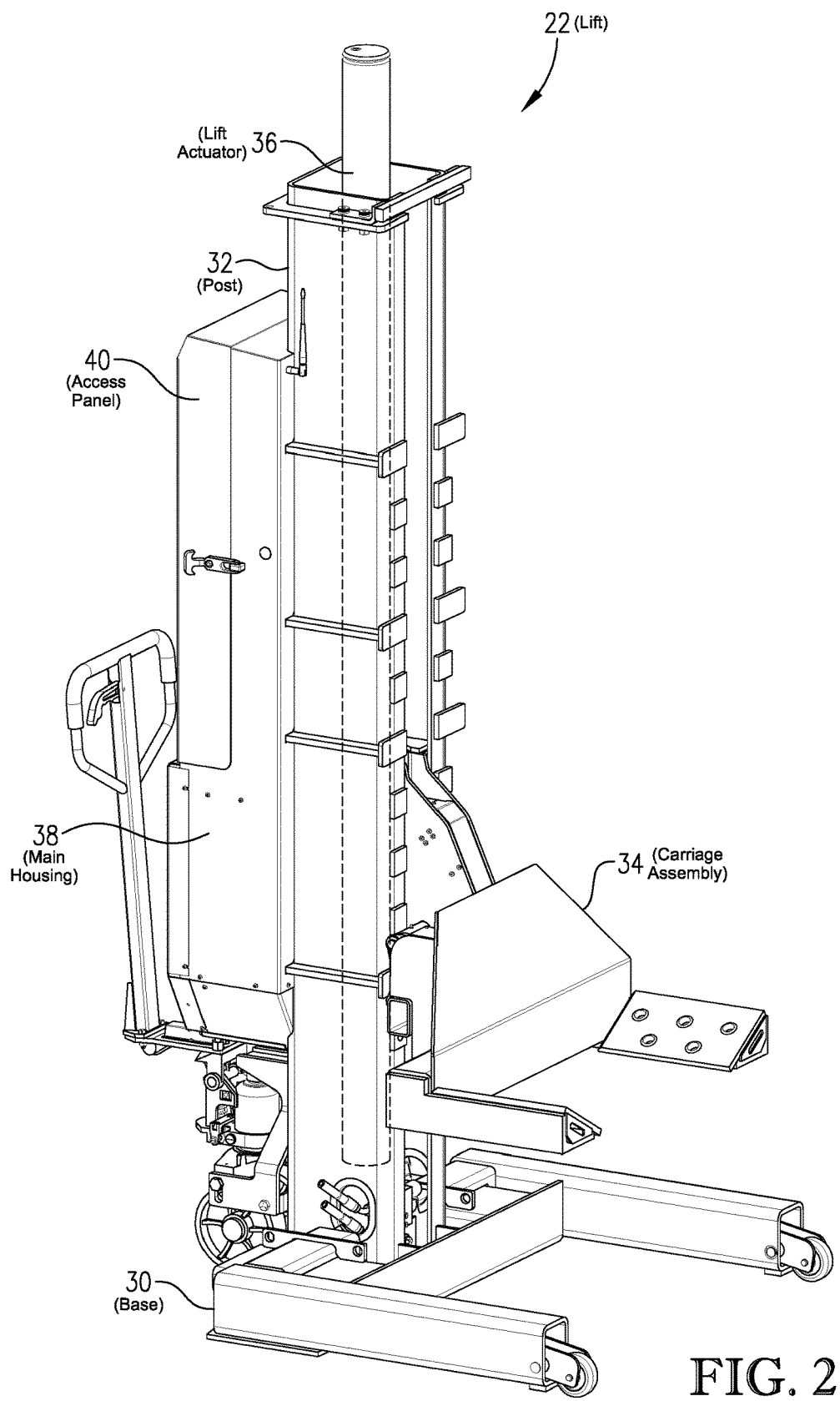
FIG. 2 is a perspective view showing the front and side of a wireless portable lift configured in accordance with certain embodiments of the present invention.
Figure 3A:
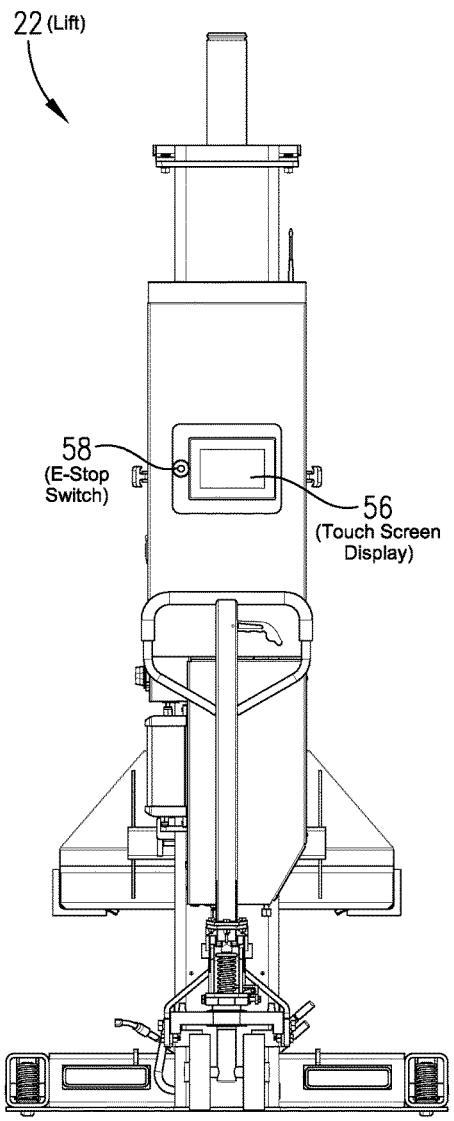
FIG. 3a is a back elevation view of the wireless portable lift of FIG. 1.
Figure 3B:
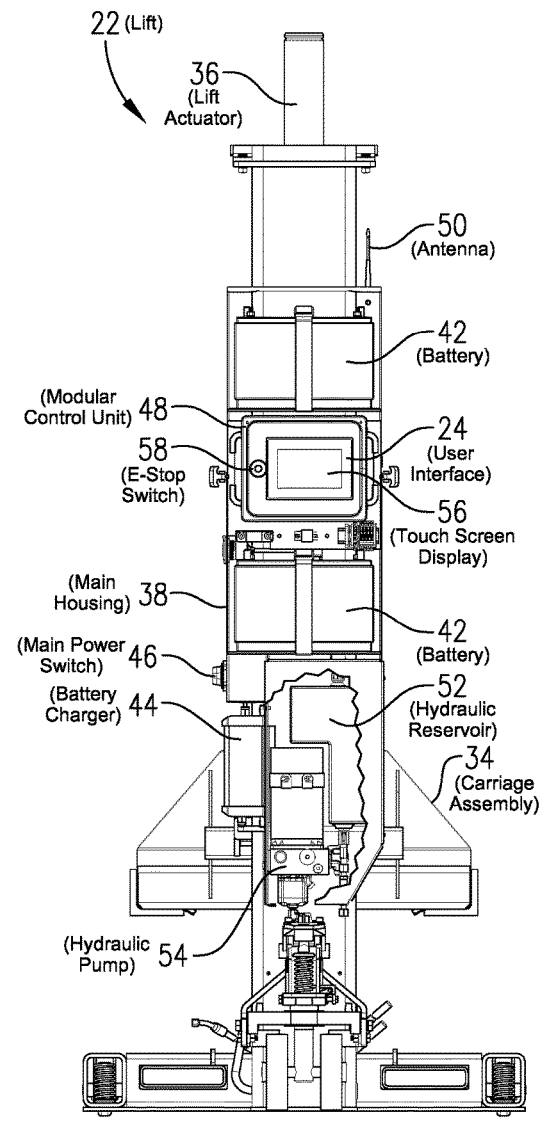
FIG. 3b is a back elevation view of the wireless portable lift of FIG. 1, with certain portions of the main housing being remove or cut away to show individual components of the lift's electrical supply system, electronic control system, and hydraulic power system.

Turning now to FIGS. 2, 3*a*, and 3*b*, a wireless portable lift 22 configured in accordance with one embodiment of the present invention is illustrated. The lift 22 can include a base 30, a post 32, a carriage assembly 34, a lift actuator 36, and a main housing 38. The base 30 supports the lift on the floor or the ground. The post 32 is rigidly coupled to the base 30 and extends upwardly therefrom. The carriage assembly 34 is configured to engage the wheel of a vehicle and is vertically shiftable relative to the post 32. The lift actuator 36 is received in the post 32 and is operable to vertically raise and lower the carriage assembly 34 relative to the post 32 and the base 30. The main housing 38 is attached to the post 32 and encloses many of the components of that make up the control and power systems of the lift 22. The main housing 38 includes a removable access panel 40 for providing access to various components of the control and power systems.

FIG. 3*b* provides a view of the back of the lift 22 with the access panel 40 being removed to show certain internal components located in the upper portion of the main housing 38. In FIG. 3*b*, a lower portion of the main housing 38 is also cut away to show certain internal components located in the lower portion of the main housing 38.

The lift 22 generally includes an electrical power supply, an electronic control system, and a hydraulic power system. More specifically, FIG. 3*b* shows that the electrical power supply system of the lift 22 can include two rechargeable batteries 42, a battery charger 44, and a main power switch 46; the electronic control system of the lift 22 can include a modular control unit 48 and an antenna 50; and the hydraulic power system of the lift 22 can include a hydraulic reservoir 52 and a hydraulic pump 54. Many other components of the power supply system, electronic control system, and hydraulic power system of the lift 22 are not shown in detail in FIG. 3*b*, but will be described in greater detail below. FIG. 3*b* shows that the modular control unit 48 includes a user interface 24 that includes a touch screen display 56 and an emergency stop (E-stop) switch 58.

Figure 4:
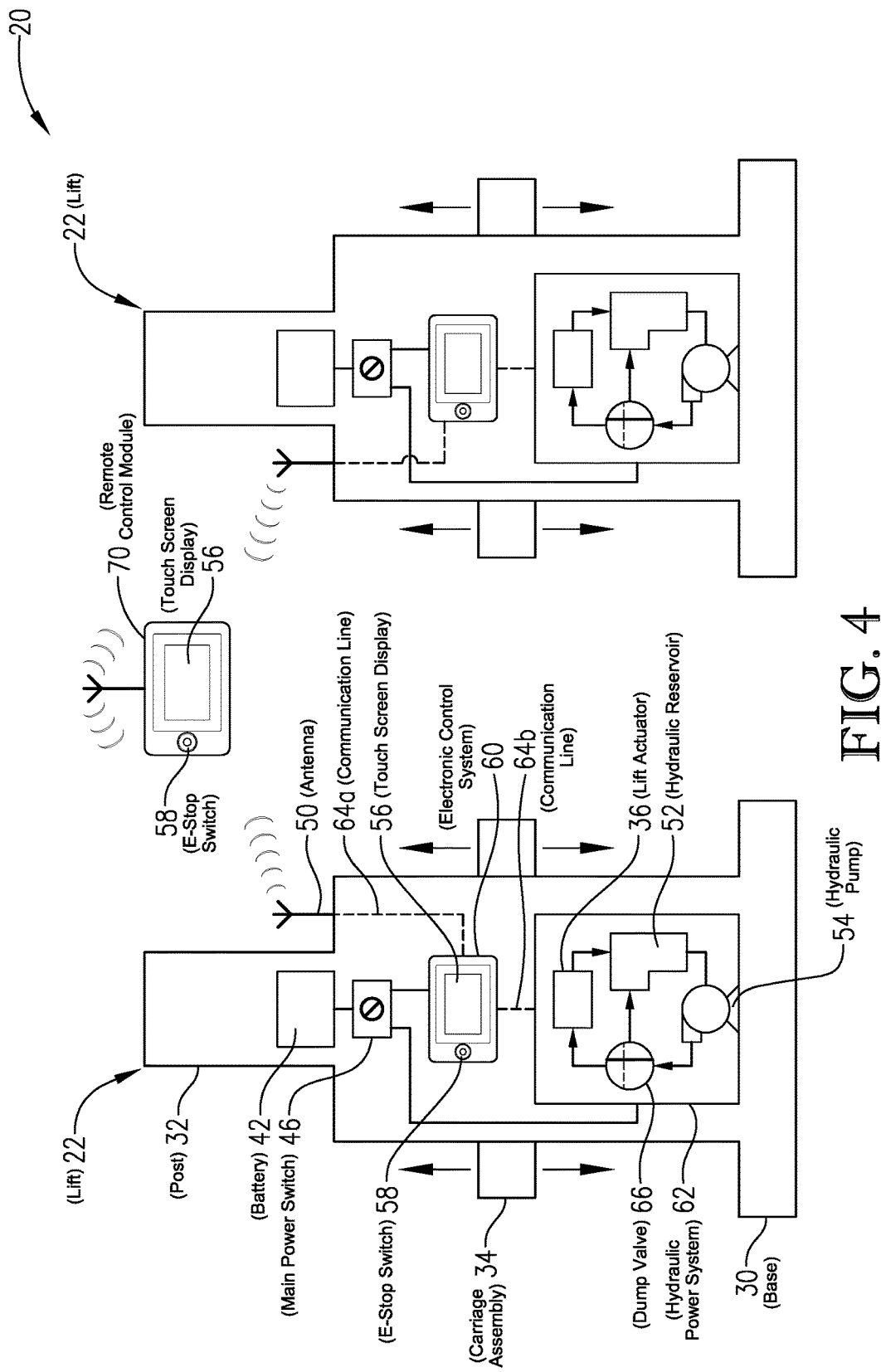
FIG. 4 is a simplified representation of a wireless portable lift system, showing the major components of an emergency stop system configured in accordance with certain embodiments of the present invention.

FIG. 4 provides a simplified representation of a wireless portable lift system 20, where each lift 22 is equipped with an enhanced E-stop system. As shown in FIG. 4, each lift can include a base 30, a post 32, a carriage assembly 34, a power source (e.g., battery 42), a main power switch 46, an electronic control system 60, and a hydraulic power system 62 for vertically shifting the carriage assembly 34 relative to the post 32. The electronic control system 60 can be used to control the hydraulic power system 62. The electronic control system 60 can include a touch screen display 56, an E-stop switch 58, an antenna 50, and communication lines 64*a,b*. The hydraulic power system 62 can include a hydraulic reservoir 52, a hydraulic pump 54, a dump valve 66, and a hydraulic actuator 36 (e.g., a hydraulic cylinder). The combination of the E-stop switch 58 and the dump valve 66 provides the lift system 20 with enhanced safety, as described below.

As shown in FIG. 4, the dump valve 66 can be shiftable between a powering configuration (shown by the vertical solid line in the dump valve 66 of FIG. 4) and a recirculating configuration (shown by the horizontal dashed line in the dump valve 66 of FIG. 4). When the dump valve 66 is in the powering configuration, the dump valve 66 routes hydraulic fluid from the hydraulic pump 54 to the hydraulic actuator 36 for use in raising the carriage assembly 34 relative to the post 32. When the dump valve 66 is in the recirculating configuration, the dump valve 66 routes (recirculates) hydraulic fluid from the hydraulic pump 54 back to the hydraulic reservoir 52, bypassing hydraulic actuator 36.

An important feature of the dump valve 66 is that it is biased toward the recirculating configuration and is only shifted into the powering configuration when electrical power is supplied to the dump valve 66. As such, if electrical power is cut to the dump valve 66, the dump valve 66 automatically shifts into the recirculating configuration. Once the dump valve 66 is in the recirculating configuration, the hydraulic actuator 36 cannot be used to raise the carriage assembly 34, even if the pump 54 continues to run, because hydraulic fluid is diverted around the hydraulic actuator 36 and back to the reservoir 52.

In order to raise the carriage assembly 34, electrical power must be provided to the dump valve 66 to shift the dump valve 66 into the powering configuration. Such instructions to raise the carriage assembly 34 can be received via the touch screen display 56. Upon receiving the raise instructions input from the touch screen display 56, the electronic control system 60 can communicate a dump valve power-up signal to all the lifts 22 of the system 20. This dump valve power-up signal ensures that all the dump valves 66 of all the lifts 22 are shifted into a powering configuration in order to raise the lifts 22.

In certain embodiments of the present invention, each lift 22 has an E-stop switch 58. When the E-stop switch 58 is actuated by an operator of the lift system 20, the electronic control system 60 sends a signal via communication line 64b to cut electrical power to the dump valve 56 of the lift 22 on which the E-stop switch 58 was actuated. In addition, when the E-stop 58 switch is actuated, the electronic control system 60 of the lift 22 on which the E-stop was actuated wirelessly transmits an E-stop signal for receipt by the other lifts 22 of the system 20. Once the E-stop signal is received by the other lifts 22, power is cut to the dump valves 66 of all the lifts 22 of the system 20.

As depicted in FIG. 4, the lift system 20 can optionally employ a remote control module 70 to wirelessly control the lifts 22 from a location spaced from the lift system 20. In embodiments where the lift system 20 is controlled using the remote control module 70 that is not rigidly coupled to the lifts 22, the remote control module 70 communicates wirelessly with components of the lifts 22 that are physically coupled to the lifts 22. In one embodiment, the remote control module 70 can be a user interface that is readily attached to and detached from one of the lifts 22. In certain embodiments, only one of the lifts 22 of the lift system is equipped with a detachable remote control unit 70. In other embodiment, each of the lifts of the lift system 20 includes an identical detachable remote control unit 70.

As depicted in FIG. 4, the remote control module 70 can be equipped with a touch screen display 56 and an E-stop switch 58. When the E-stop switch 58 on the remote control module 70 is actuated, the remote control module 70 wirelessly transmits an E-stop signal, which the results in power being cut to all the dump valves 66 on all the lifts 22 of the system 20. In one embodiment, the E-stop signal transmitted by the remote control module is directly received by each of the lifts 22 of the system 20. In another embodiment, the E-stop signal transmitted by the remote control module 70 is received by a master lift of the system 20, and the master lift thereafter communicates the E-stop signal to the remaining slave lifts of the system.

Referring again to FIG. 4, in accordance with certain embodiments of the present invention, the hydraulic power system 60 of the lift 22 can include one or more features for enhancing performance and reliability of the hydraulic power system 60. For example, as shown in FIGS. 3b and 4, the hydraulic pump 54 can have a fluid inlet that is located below the fluid outlet of the hydraulic reservoir 52. This configuration can be advantageous in that it facilitates gravity feed of hydraulic fluid from the hydraulic reservoir to the hydraulic pump 54. This gravity-feed feature provides improved energy efficiency (battery life) over conventional portable lift systems because the hydraulic pump 54 is not required to pump hydraulic fluid up from the reservoir 52 every time the lift 22 is actuated. In addition, the tank used as the hydraulic reservoir 52 can have an enhanced physical configuration. In certain embodiment the hydraulic reservoir 52 can be non-cylindrical, with substantially planar side walls. In one embodiment, the hydraulic reservoir 52 has a generally inverted L configuration, with the hydraulic pump 54 and/or dump valve 66 being at least partly received in the gap of the inverted L.

Figure 5A:
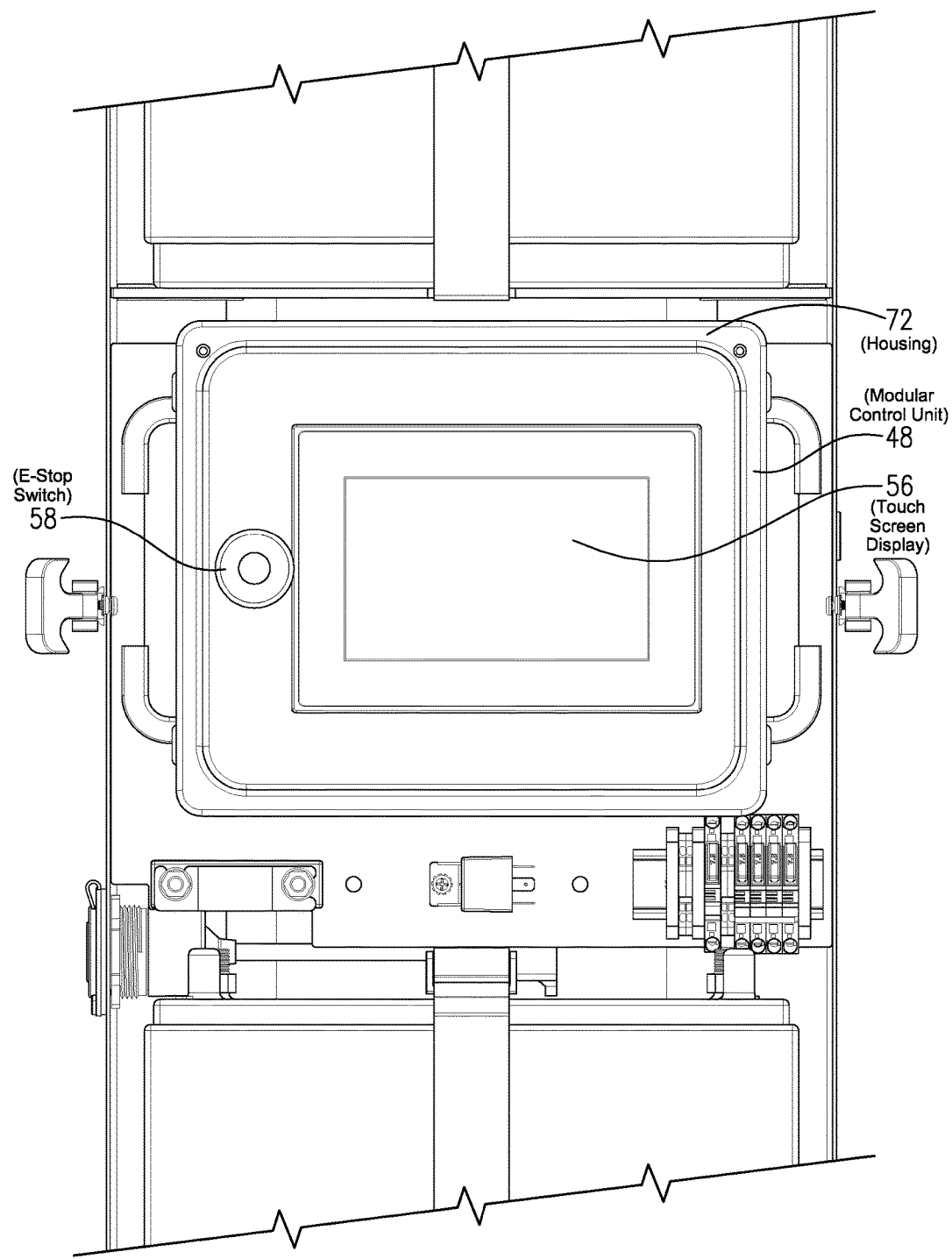
FIG. 5a is an enlarged view of the modular control unit of the wireless portable vehicle lift shown in FIG. 3b, where the housing of the modular control unit is closed to protect its internal components.
Figure 5B:
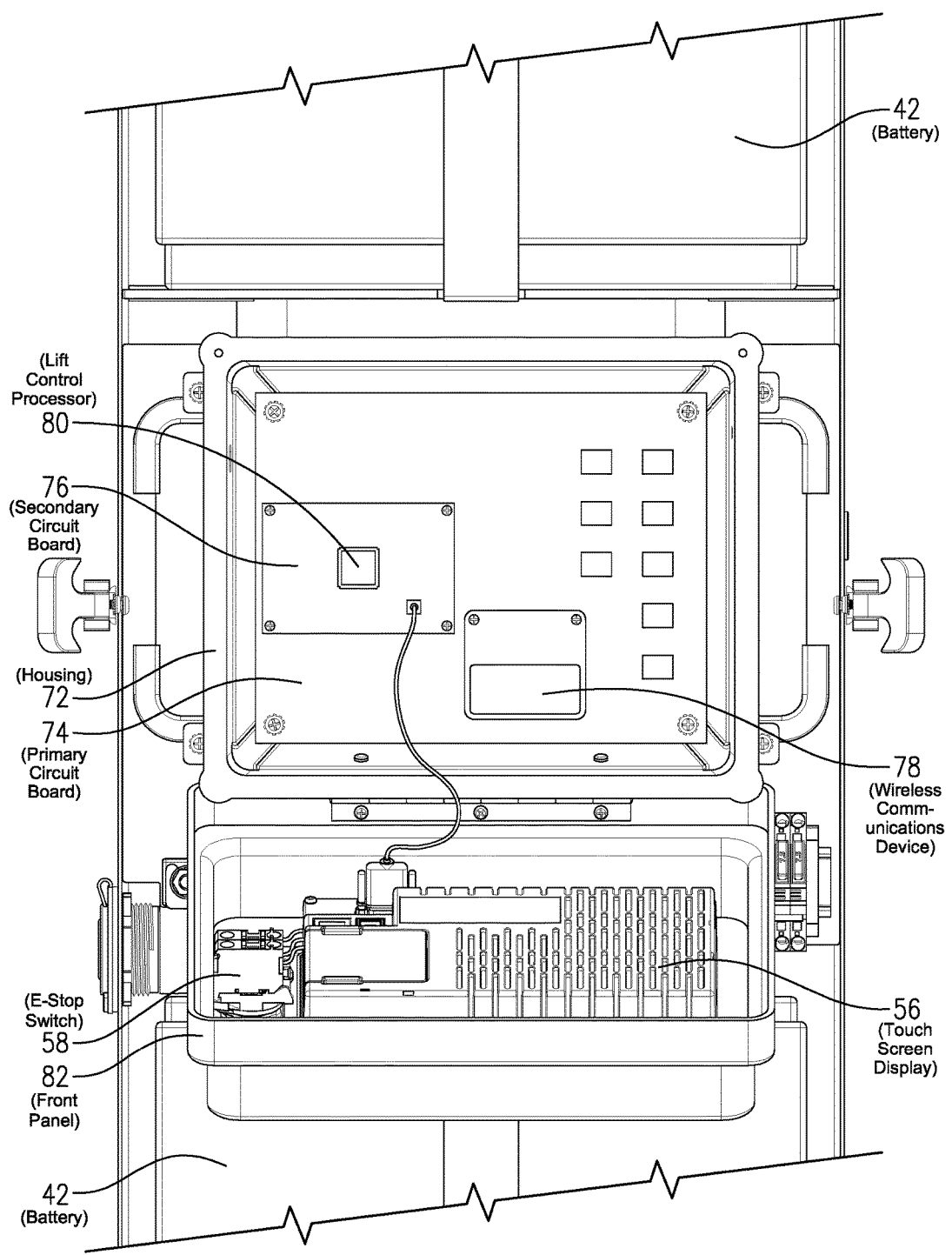
FIG. 5b shows the modular control unit of FIG. 5a with the housing opened to provided access to the internal components.

Referring now to FIGS. 5a and 5b, where there is provided an enlarged view of the modular control unit 48 originally described with reference to FIG. 3b. FIG. 5a shows the front of the modular control unit 48 in its assembled configuration, while FIG. 5b shows the modular control unit in an open configuration, revealing its internal components. As depicted in FIG. 5b, the modular control unit 48 can include a housing 72 into and/or onto which all components of the unit 48 are mounted. Specific components mounted on/in the modular control unit 48 include a touch screen display 56, an E-stop switch 58, a primary circuit board 74 (motherboard), a secondary circuit board 76 (daughter board), and a wireless communication device 78. The wireless communication device 78 can be a radio frequency transceiver. In one embodiment the wireless communication device is an adaptive frequency hopping transceiver. In additions, one or both of the circuit boards 74, 76 can include a lift control microprocessor 80 for processing information relating to the lift sensors and actuators.

The primary circuit board 74, secondary circuit board 76, and wireless communication device 78 are mounted inside the housing 72, where they are protected from the external environment. The touch screen display 56 and E-stop switch 58 are mounted in openings in the front panel 82 of the housing 72, so that they can be accessed by a lift operator when the housing 72 is closed. In certain embodiments, the front panel 82 of the housing 72 can be equipped with a docking station so that a remote control module that includes the touch screen display 56 can be releasably attached to the modular control unit 48.

One advantage provided by the modular control unit 48 is that it can easily be removed from the lift and replaced by another modular control unit 48. Most of the key components of the lifts electronic control system are included in the modular control unit 48. Thus, if a problem with the lifts electronic control system is experienced, a new modular control unit can simply be shipped to the lift owner and easily swapped out for the old one. This avoids downtime and expense associated with having a service technician travel to the lift location to diagnose and repair a problem with the electronic control system.

To facilitate easy change out the modular control unit 48, the modular control unit 48 can be equipped with electronic communication plugs for electrically connecting the modular control unit 48 to other components of the lift. In certain embodiments, the modular control unit is equipped with not more than five, not more than four, or not more than three electronic communication plugs. For example, one electronic communication plug can be used to connection the wireless communication device 78 of the modular control unit 48 with the antenna 50; one electronic communication plug can be used to connect the E-stop switch 58 of the modular control unit 48 to the dump valve 66; and one electronic communication plug can be used to connect one or both of the circuit boards 74,76 to various sensors or actuators of the lift 22.

Referring generally to FIGS. 1-4, several enhanced performance and safety features suitable for implementation into the wireless portable lift system 20 will now be briefly described. In particular, the lift system 20 can be provided with an auto-engage performance feature, an auto-resynchronize performance feature, a motion sensing safety feature, obstruction detection safety feature, a physical lockout-tagout safety feature, a pass code safety feature, a training verification safety feature, and/or a dual input safety feature. These various performance and safety features are described immediately below with reference to FIGS. 1-4.

In certain embodiments of the present invention, the electronic control system 60 of the wireless portable vehicle lift system 20 can be programmed with an auto-engage function that simultaneously raises the carriage assemblies 34 of all of the lifts 22 until the carriage assemblies 34 engage the vehicle wheels and then stops each of the carriage assemblies 34 in an engaged position upon engagement with the wheels. When the lift system 20 is equipped with auto-engage functionality, each of the lifts 22 can include a weight sensing mechanism configured to detect the weight supported by the carriage assembly 34. The auto-engage function is configured to stop the carriage assembly 34 when the weight sensing mechanism senses a weight above a preset engagement weight. The electronic control system 60 can programmed to use the engaged positions to determine an initial level configuration for the carriage assemblies 34.

In certain embodiments of the present invention, the electronic control system 60 of the portable vehicle lift system 20 can be programmed with an auto-resynchronization function that automatically resynchronizes the vertical positions of the carriage assemblies 34 after an unsynchronized condition has been identified. The electronic control system 60 can be configured to automatically detect the existence of the unsynchronized condition and provide the lift operator with a visual indication of the unsynchronized condition.

In certain embodiments of the present invention, each of the lifts 22 of the system 20 can include a lift motion indicator for providing an audible and/or visual warning when the lift 22 is being raised and/or lowered. The lift motion indicator can include a light configured to flash during raising and/or lowering of the lift 22. The lift motion indicator can additionally or alternatively include an audible alarm that beeps during raising and/or lowering of the lifts 22.

In certain embodiments of the present invention, the lift system 20 can be equipped with an obstruction detection system for detecting foreign objects located below the lifted vehicle prior to lowering the lifted vehicle. The obstruction detection system can be configured to scan the area within the perimeter of the lifts 22 for foreign objects. Such scanning can utilize optical, thermal, acoustical, infrared, and/or microwave energy to detect foreign objects.

In certain embodiments of the present invention, the lift system can be equipped with a physical lockout-tagout system for preventing unauthorized operation of the lift system. The physical lockout-tagout system can include at least one removable key associated with each lift, wherein insertion or removal of one or more of the keys from one or more of the lifts disables the lift system.

In certain embodiments of the present invention, the touch screen display of the user interface 24 can be programmed to include a pass code screen that prompts the operator to enter a pass code prior to operating the lift system 20. Such a pass code screen can include an input section for the operator to input a pass code. The electronic control system 60 can include onboard database, or can have access to a remote database, containing one or more stored authorized pass codes. If a pass code is entered that does not match one of the stored authorized pass codes, the lift system 20 can be rendered inoperable.

In certain embodiments of the present invention, the touch screen display of the user interface 24 can be programmed to include a training verification screen that queries the lift operator as to whether the operator has been trained to operate the lift system 20. The training verification screen can include an input section for the operator to confirm or deny whether the operator has been trained to operate the lift system 20. The lift system 20 can be rendered inoperable if the operator denies having been trained on the lift system 20.

In certain embodiments of the present invention, the electronic control system 60 of the lift system 20 can be programmed so that movement of the lifts requires dual operator input from at least two locations on the touch screen display of the user interface 24. The user interface 24 can also include one or more function buttons separate from the touch screen display. In certain embodiments, the electronic control system 60 is programmed so that movement of the lifts requires dual operator input from via both the touch screen display and at least one of the function buttons.

Figure 6:
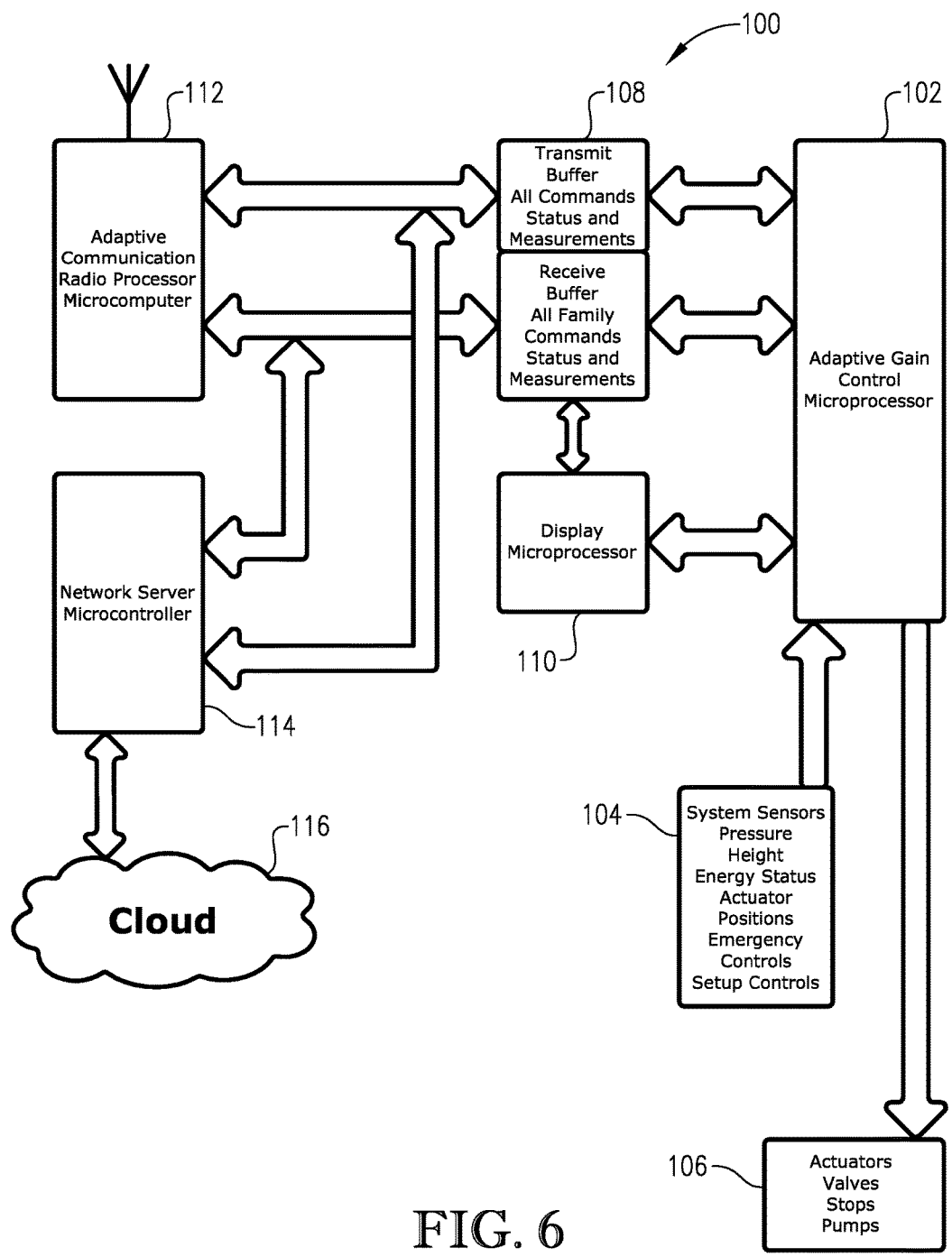
FIG. 6 is a schematic diagram of the main components of an electronic control system for a wireless portable lift system configured in accordance with certain embodiments of the present invention.

FIG. 6 provides a schematic depiction of an electronic control system 100 for a wireless portable lift system, such as the lift system described above. The control system 100 of FIG. 6 includes of a parallel group of microprocessor and microcontroller systems each functioning in a specific task area in a coordinated manner to provide a high performance, safe lifting system. The control system 100 enables a complex coordinated lift involving anywhere from two to twenty independent lifts. The lift or lower must be performed rapidly, and with a high degree of safety and precision. Each individual lift involved in the lift ensemble must be capable of tracking its own actions together with the actions of all other lifts in the group and determining as part of a collective intelligence a lift or lower strategy keeping the lifts together, maintaining a high level of safety, precision, and lift integrity.

The task of lifting, safety checking, and coordination of the individual tasks in a wireless portable lift system is large and may be difficult or impossible to be done in a real time manner by a single processor in each lift that is single or even multi threaded. Because of the safety and performance requirements of the modern portable lift system the inventors have found that the task may advantageously be divided into functional areas with processors accomplishing their individual tasks in a near real time environment. The processors can be tied together with a network or by a direct memory access (DMA) technology. This method allows all of the processors to share a common area of memory 108 where the individual processors push and pop commands or data between one another and other processors in a multiple lift system in an achromous manner. This method provides for a very rapid response of the system to commands and to the varying conditions in the multi-lift system during a lift or lowering operation, or lift housekeeping tasks.

The use of parallel multi-processors is unique in the portable lift industry because up to this point the lifting task has been simple. However, recently the requirements on the lift systems has increased and has become more complicated. Thus making use of a single microcontroller would result in degraded safety, lack of capability, and lift performance. By dividing the task into a set of parallel, yet coordinated, set of microprocessors or microcontrollers the more complex tasks as well as the fundamental tasks can be performed more quickly, more safely and with greater precision.

In certain embodiments, the multiprocessor system consists of two, three, four, five or six processors in each lifting column. The control processor 102 in the individual lifting columns is an adaptive gain control processor. This processor 102 receives data from all of the sensors 104 in the lift system ensemble as well as the data from its own portable lift sensors including but not limited to pressure, energy use and energy levels, lift height, lift velocity, and parameters that check the environment for the safe use of the lift system. All of this data is used by the collective intelligence of the lifting ensemble to effectively perform a coordinated lift or lower of the ensemble. The adaptive gain processor 102 is also interfaced to all user portable lift ensemble control inputs and emergency requests from sensors or the lift's operator. This adaptive processor 102 performs control of all actuators, valves, pumps, stops, and emergency equipment 106. This processor 102 gives and receives commands from the DMA data hub area of shared memory 108 for the system, as well as the local controls and display. The adaptive control processor 102 takes advantage of an artificial intelligence algorithm to perform its intended task. This is the ability of the control processor 102 to learn from its environment and use this data to more effectively and safely perform the lifting tasks.

Control of the individual portable lift system as well as the control of the ensemble of lifts has become more complex due to the increased capability of the newer lift systems and the higher margins of safety that are required. Current technology uses a simple text display and a raise lower switch as the input/output devices. The new lift systems must have more elegant and ergonomically designed human interfaces that inform the operator in a clear and concise manner of the operational aspects of the lift when in operation. The interface must allow the operator to easily and safely access the full functionality of the new features of the modern lift system. This interface system can consist of a touch screen display, voice actuated commanding and recognition systems and audio and visual feed back to the operator. This display can be capable of surveying the work area of the lift using such sensors as LIDAR or acoustic techniques, thus insuring a safe and accident free lift operation. The display processor 110 can communicate using the DMA interface to assure near real time functionality. However, a conventional network technology can be used, but it may result in degraded performance.

An integral part of the multi-processor lift system 100 is an adaptive communication system 112 for the communication between individual lifts in an ensemble that have a common lifting purpose. It is the responsibility of the communication system to keep all DMA areas of all lifts synchronized, and to provide emergency data in the event of an unplanned movement of the lift system or the user. Because communication is so critical in a high performance lift system the tolerance for error is very small. It is for this reason that an adaptive rather than a conventional data communication system is chosen.

The adaptive communication system 112 is frequency agile, protocol agile, and power agile. The system is capable of changing its RF channel if the current frequency is congested and determining a radio frequency of minimum noise content. This channel agility process occurs on a continual basis during the operation of the lift system. The communication system's 112 moves are coordinated between the individual adaptive communication processors in the lifting ensemble. The adaptive system 112 uses an artificial intelligence algorithm to learn and adapt to the area of operation. The system, in addition to conventional error processing such as parity and CRC checking, can change its message timing and protocol in order to assure no possibility that the system can be jammed or spoofed causing a hazardous movement of the lift system. The adaptive communication system 112 is capable of providing a separate isolated smart RF channel or link for the handling of emergency information in the event of the failure of one or more of the communication processors. The adaptive primary communication system and the smart emergency communication system are DMA devices allowing the information programmed for the individual lift columns to be moved rapidly from the display and control processor's memory to the other lifts in the ensemble in a near real time manner.

The adaptive communication processor provides the secure communication link between the individual portable lifts in a lifting ensemble. A smart network server processor/microcontroller 114 provides a link from the individual lifts to the cloud 116. This link allows the lifts to be part of a collective the intelligence of all lifts of the model type, or that have the server processor/microcontroller 114 as part of their architecture and that have been manufactured by a common manufacturer. The network server processor/microcontroller 114 allows the individual lift to be part of a data sharing network by which individual lifts can share use data, maintenance data, and status, and operational status data with a common server or server family for the purpose of determination of maintained scheduling, malfunction determination, fault analysis, and software and firmware update. This data link takes advantage of local open or secures data networks or cellular data networks. This connection to the cloud 116 allows the remote operation of the lifts, and a remote diagnosis of faults, maintenance practices, and usage of the individual lifts.

The multi-processor architecture of control system 100 is configured to make the wireless portable vehicle lift system a high performance, extremely safe and secure, and versatile piece of shop equipment. The multi-processor architecture provides a new communication capability between individual lifts and a unique intelligent network of all lifts in a production family.

In view of the foregoing, in certain embodiments of the present invention, each of the portable lifts can be equipped with at least a first microprocessor and a second microprocessor that are configured to communicate with one another, perform distinct tasks operate in parallel, share a common memory, and/or communicate with one another using direct memory access (DMA) technology. Each of the portable lifts can include a common command buffer system for provide communication between the first and second microprocessors. The common command buffer system can include a transmit buffer for transmitting information to the first and second microprocessors and a common receive buffer for receiving information from the first and second microprocessors.

In certain embodiments, each of the portable lifts can further include a third microprocessor configured to communicate with the first and second microprocessors. The first, second, and third microprocessors can be configured to operate in parallel, share a common memory, and/or communicate with one another using DMA technology. The common transmit buffer, described above, can transmit information to the first, second, and third microprocessors and the common receive buffer can receive information from the first, second, and third microprocessors.

In certain embodiments, each of the portable lifts can further include a fourth microprocessor configured to communicate with the first, second, and third microprocessors. The first, second, third, and fourth microprocessors can be configured to operate in parallel, share a common memory, and/or communicate with one another using DMA technology. The common transmit buffer can transmit information to the first, second, third, and fourth microprocessors and the common receive buffer can receive information from the first, second, third, and fourth microprocessors.

In certain embodiments, each of the lifts can include a lift control system having one or more sensors and one or more actuators. One microprocessors of the lift can be a control microprocessor configured to process information related to the lift control system. The sensors of the lift control system can include a height sensor, a pressure sensor, an energy status sensor, a velocity sensor, and/or an actuator position sensor. The actuators of the lift control system can include the lift actuator, a down-stop actuator, an emergency stop actuator, a hydraulic valve, and/or a hydraulic pump.

In certain embodiments, each of the lifts further includes a user interface system having one or more input and/or output devices. One of the microprocessors of the lift can be the interface microprocessor that is configured to process information related to the user interface system. The user interface system can include a touch screen display. The interface microprocessor can be programmed to display at least 40, 80, 120, 160, 200, 240, 280, 320, 360, 400 unique operator interface screens on the touch screen display. Further, the user interface can include a voice actuated command module.

In certain embodiments, the lift system can include a wireless inter-lift communication system including one or more wireless transmitters and/or wireless receivers associated with each of the lifts. In such an embodiment, one of the microprocessors of the lift can be an inter-lift communication microprocessor configured to process information related to the inter-lift communication system. The wireless transmitters and/or wireless receivers of the inter-lift communication system can include a radio frequency (RF) transceiver.

In certain embodiments, the inter-lift communication microprocessor can be an adaptive communication microprocessor configured to automatically adjust one or more communication parameters to thereby maintain communication integrity and/or security. Such communication parameters can include frequency, protocol, and/or power. The adaptive communication system can be configured to automatically scan communication frequencies and select a frequency with minimal noise. In certain embodiments, the wireless inter-lift communication system can include an artificial intelligence system configured to gather wireless environment information about the local communication environment and control the wireless transmitters and/or wireless receivers based on the wireless environment information.

In certain embodiments, the lift system can include a wireless network server communication system transmitting information to and/or from a remote location. In such an embodiment, one of the microprocessors can be a wireless network server communication microprocessor configured to process information related to the network server communication system. The remote location can be at least 10, 50, 100, or 200 miles away from the location of the wireless portable vehicle lift system. The wireless network server communication system can be configured to communicate with the remote location via a cellular telephone network or the internet.

In certain embodiments, each of the lifts includes a control microprocessor configured to process information related to the lift control system, an interface microprocessor configured to process information related to the user interface system, an inter-lift communication microprocessor configured to process information related to the inter-lift communication system, and a wireless network server communication microprocessor configured to process information related to the network server communication system.

Figure 7A:
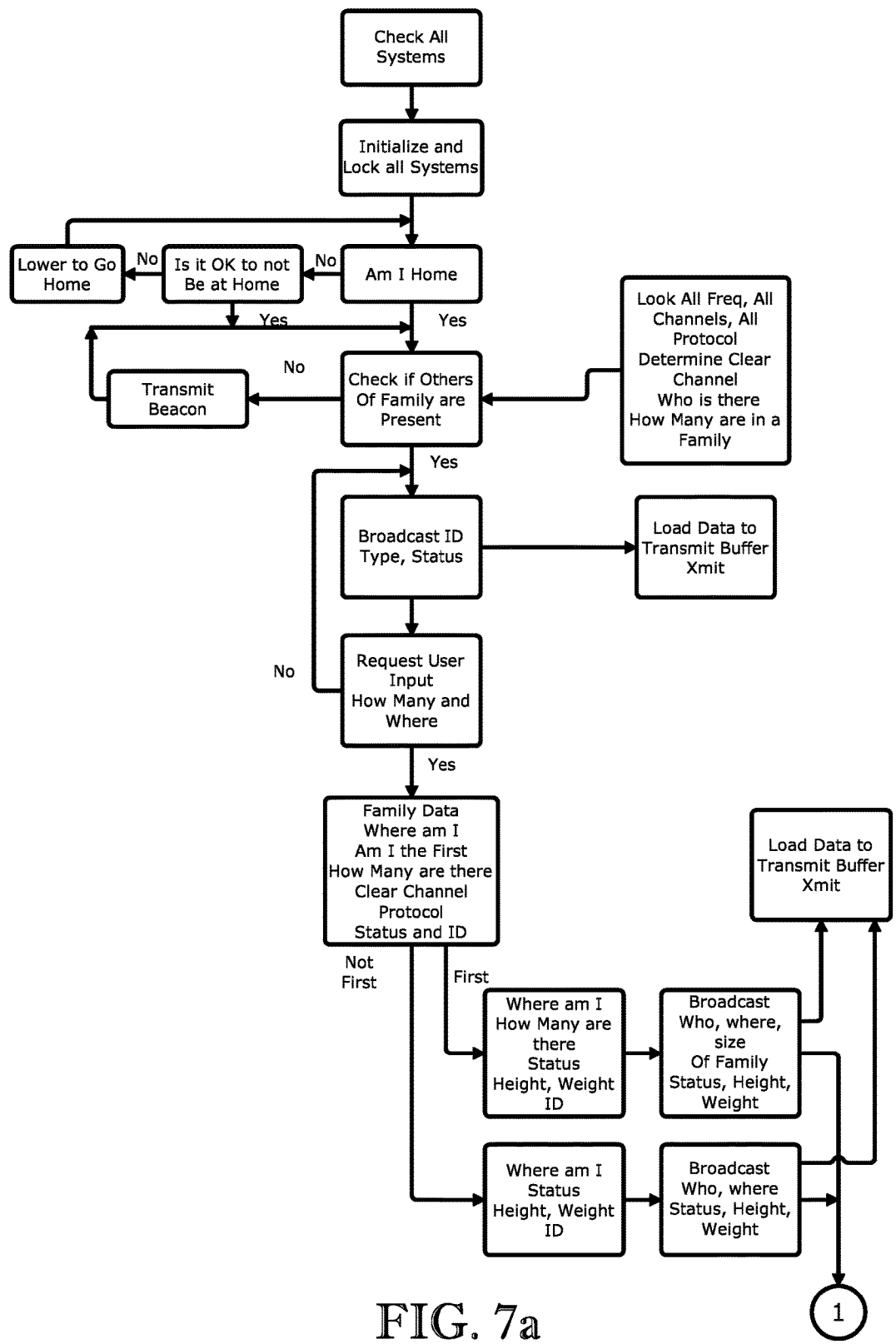
FIG. 7a is sheet one of a two-part a flow diagram for an overall method of operating a wireless portable lift system.
Figure 7B:
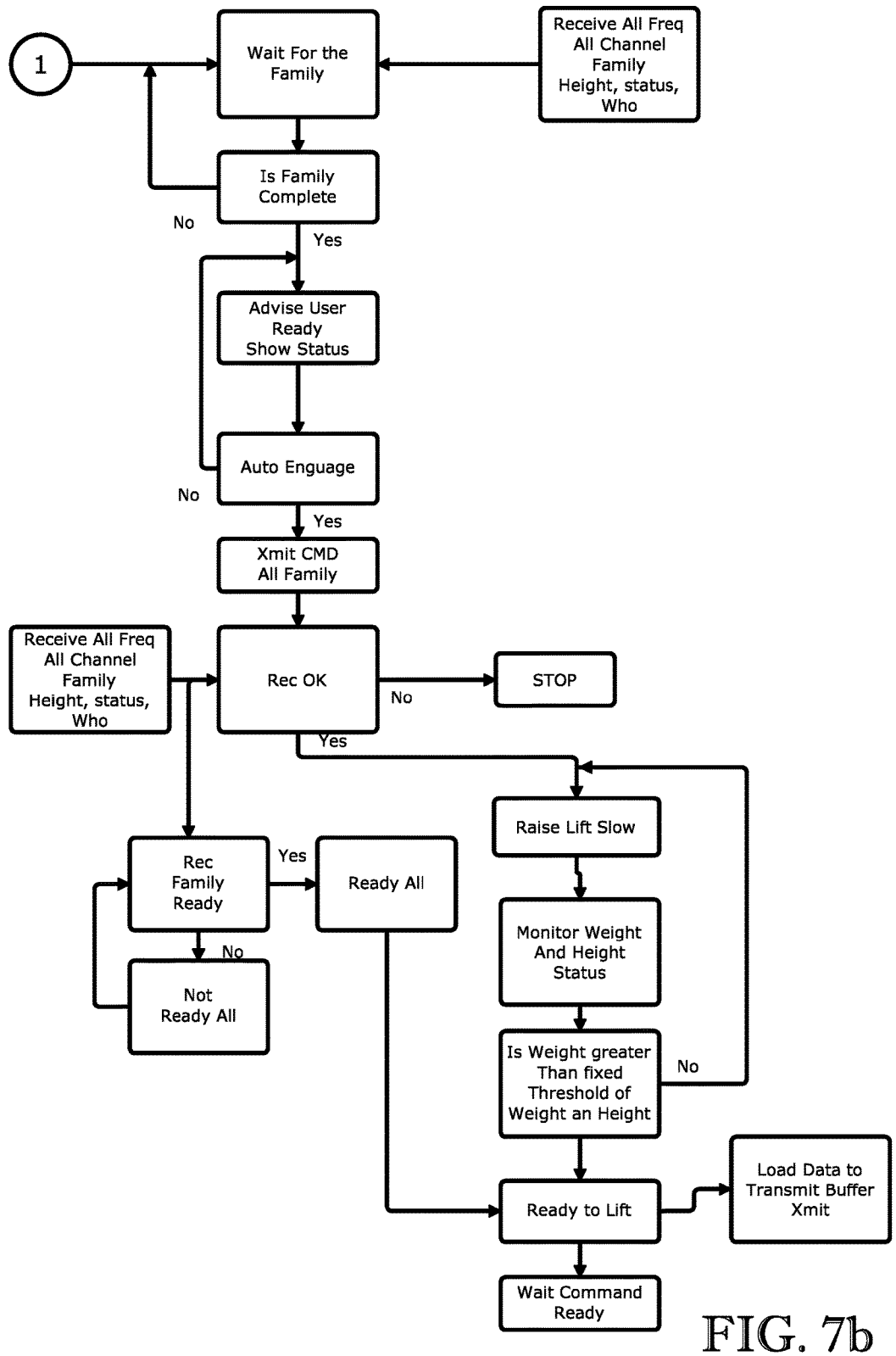
FIG. 7b is sheet two of the two-part flow diagram (started in FIG. 6a) for an overall method of operating a wireless portable lift system.

FIGS. 7a and 7b provide an overall flow diagram outlining major steps involved in operating a wireless portable lift system configured in accordance with certain embodiments of the present invention. When the lift unit is initially turned on, the lift unit will perform a self-check of all of the operable systems that control the movement of the lift system or display data or take commands from the operator. If all systems come back with a valid response the unit will determine its state of position (i.e., is the lift in the home position or is the lift in some position other than the home position thus telling the central processor that the lift may have been shut off or failed in the lift position). If the unit is in other than the home position it will measure the weight of the lift forks to determine if there is a vehicle on the lift or is the lift empty. If there is no weight on the system the lift will initiate a request to the operator to return to home. If there is weight on the system the lift system will assure that paws are engaged and that the lift remains in this position until grouped or manually lowered by the operator.

The lift now uses the radio link system in a pre-determined default channel and later looking to all available channels to determine if there are other lifts that the lift could be grouped with (i.e., lifts that have not been grouped but are on line and transmitting an identification). The radio will ignore all lifts that are already grouped or are part of another lifting ensemble. If there are no other lifts in the potential ensemble then the lift will initiate a beacon signal on a pre-determined channel indicating that it the first to be on line and it is looking for others that it could be potentially be grouped with. It determines of the 256 channels of communication that are available which one is the clearest channel and places that channel ID in the beacon message with its ID and type of lift.

If the lift determines that it is not the first of the lifts to be powered up by detecting the beacon of an unpaired lift then the lift will listen for the clear channel ID and then on the beacon frequency broadcast its ID, type of lift and its status. The lift will then initiate the control operator display and indicate that the unit is ready and ready for a lift assignment and continue to broadcast its ID, type, and status, and listen for other lifts that might be potential group members . . . ignoring lifts that already are in an ensemble. This loop will continue until the operator initiates the lift and assigns its position in a lifting ensemble. The communication between the adaptive communication device and the control processor is carried out using a communication buffer resident in the control processor. The display, communication processor, network server, and the control processor all function asynchronously using the communication buffer of the control processor. Commands, data, and status information is pushed and popped from the register in real time with each independent device acting on the buffer in real time manner (i.e., the system is interrupt driven). In the event of a interrupt failure the system is halted and reset to the initial state of turn on. This serves as an operational self-check of each system and prevents unexpected or un-programmed movement or actions on the part of the individual lift system.

If the system senses other unassigned or assigned but not complete grouped units. The system will anticipate a lift assignment. Once the unit is requested by the operator as a potential lift for a lifting system it will gather the data of the other lifts as to their position number, number of lifts in the system, unit IDs, statuses, heights, weights, and communication channels and protocols and await its lifting assignment. The unit will display on the operator console all other potential lifts and their current position in an assigned lifting ensemble. The operator must now assign the position of the lifting system. The lift will determine if it is a valid lift position from the data from the other lifts. If it is a valid lift position then the unit will broadcast its unit ID, status, height, weight, and current assigned position on request by the first unit in the lifting ensemble. At this point the lifts parameters and status are kept current in the transmit receive buffers so that the radio system can reply to inquiries by the first lift to enter the lifting ensemble.

If the lifting ensemble is not complete but the lift has an assignment the lift will continue to broadcast its ID, status, lifting position, and all lifting parameters in the communication buffer on request of the first unit in the ensemble. If the unit is the first in the ensemble the unit will beacon to all potential lifts requesting them to broadcast their IDs, status, and lifting parameters in their communication buffers, as well as broadcasting its own unit ID number, assigned position, number in the projected ensemble, channel numbers, and lifting parameters in its communication buffer. The lifting parameters include but are not limited to the status, height, weight, channels, state of emergency, lift rates, and lift acceleration, and move with ID.

Once the lifting ensemble is complete the first unit in the ensemble assumes a pseudo master of the ensemble as far as communication is concerned this unit serves to pole the other units as to their ID and lifting and command buffer data. Once the lift ensemble is ready it will either be in the home position or the position that the lift system was left in when it was turned off. If the system is in the home position the lifts will ask the user if he wants to auto engage the vehicle to be lifted. If the answer is yes the units are asked to reduce the lift gain and advance in a lifting mode until a predetermined weight is captured on each of the lifts and to then stop and wait for a home or a lift command from the operator. If the lifts are not in the home position each units height will be broadcast to determine if all of the lifts are within the synchronization limit, if so the operator will be asked if he or she wants to auto synchronize the system, meaning all of the lifts will be brought to ⅛ of an inch of each other in height were the lowest units are brought to the height of the highest unit. If the units are not within the predetermined auto synchronization limits the units will error out and the operator will have to manually bring the units into the auto sync region and restart the lift process. Or the operator will be asked if he or she wants to operate in the paired mode. Once all of the units are at the same height and weight either by an auto engage or by a manual or auto synchronization the ensemble is ready for a command to any of the units to lift or to lower or to park.

At this point there is no master or slave relationship between the units in the ensemble each of the units is an independent operator with each unit knowing all other units status and lift parameters via way of the common communication buffer that all units now have. All of the communication buffers are kept in sync by the way of the intelligent radio network of the column ensemble. All units operate off the same communication buffer so a single unit whose buffer is altered by the control operator forwards this communication buffer to all other units which assume the same status thus allowing the system to make a coordinated lift or lower or common stop, emergency shut down or system reset. There is only one intelligent radio that assumes the auto poling responsibility and that is the first unit to be put on line. Any of the units can assume the auto poling task by being the first one of the ensemble to be powered on. This first unit's only unique responsibility is the poling all of the other units in the ensemble and assuring that the communication buffers remain in sync. If any communication buffer is altered by the operator control or emergency stop the first unit's intelligent radio is responsible for the propagation of the new communication buffer during an operation or shut down.

By keeping a common communication buffer within all of the units and having an auto update of the buffers all of the units function as clones of each other thus lifting and lowering in the same manner. The first unit also has the task of choosing the lead lift device in any lifting or lowering operation. The lead lift is the slowest column lift during a lifting operation and the fastest column lift during a lowering operation. Each of the lifts tracks the lead lift adjusting its lifting or lowering gain to track the lead lift. Any of the lifts can become the lead lift by being the slowest during lifting and fastest during the lowering. The lead lift may not be the same during the lift as during lower. The lead lift is determined by the comparative velocity of each lift at the onset of the lift or lower operation. In the event of an emergency stop or system reset then the lift issuing the stop becomes the lead lift. The stopping lift remains the lead lift until the stop is cleared. The lift where the command to lift or lower is not the lead lift but the command lift the lead lift is driven only by performance during the lifting or lowering operation.

Figure 8:
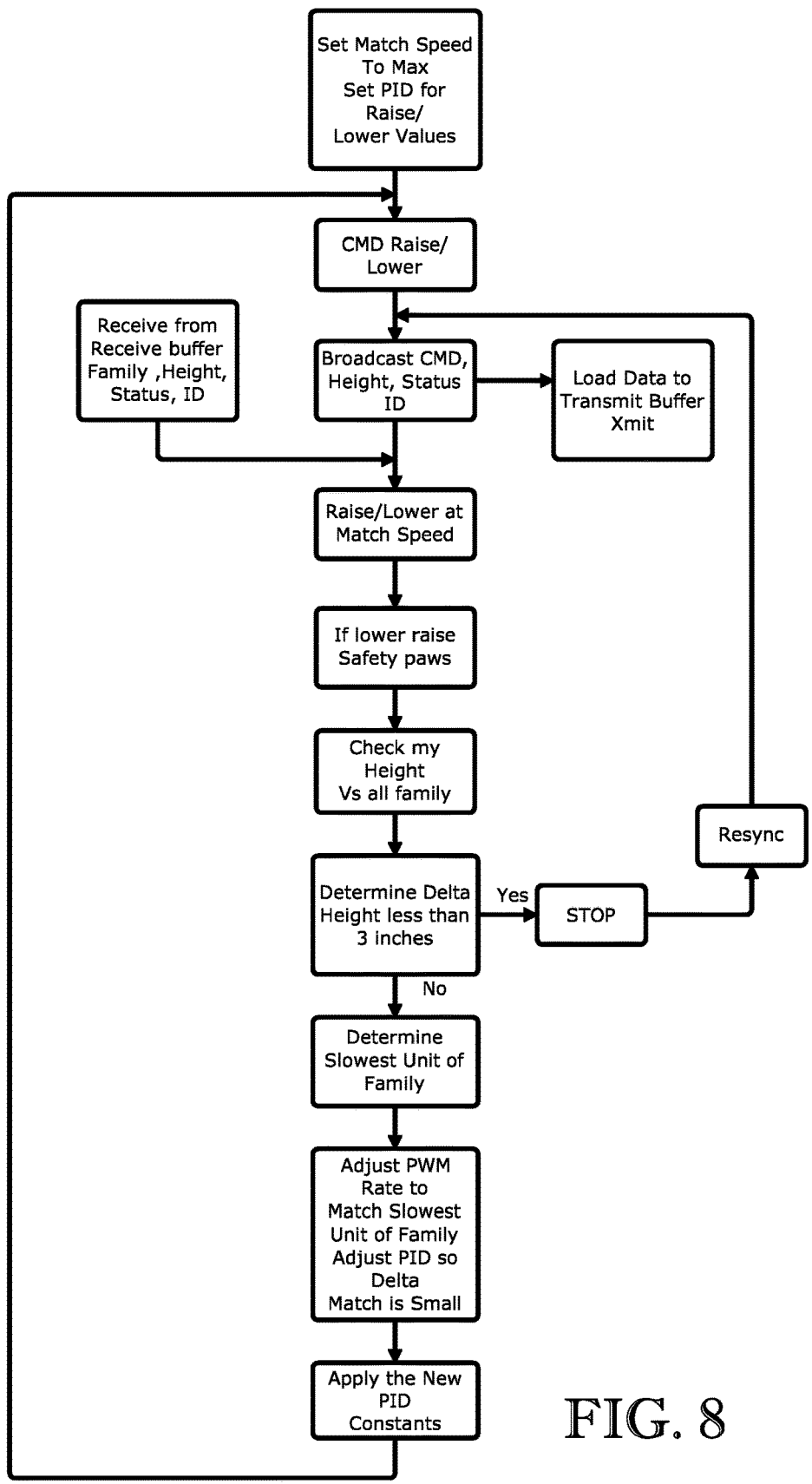
FIG. 8 is a flow diagram showing steps involved in operating a wireless portable lift system to raise and lower a vehicle.

FIG. 8 provides a flow diagram outlining steps involved in raising and lowering a wireless portable lift system configured in accordance with certain embodiments of the present invention. A raise or lower operation is initiated by one of the lifting columns receiving a command from the operators console and this command alters the common communication buffer and command buffer in all of the units. An initial lift and lower gain that has been predetermined is chosen and the lift or lowering is begun. The velocity of each of the units is immediately reported to the common communication buffer and the slowest unit is determined by all of the columns at once. Each of the column lifts then adjusts its lifting or lowering gain so that its velocity is the same as the lead unit. Where the lead unit in a lift is the slowest and the lead on a lower is the fastest. This comparison continues during the entire lift or lower operation. The gain of each unit is manifested in the PWM rate that is being used by the control processor to control the orifice of the hydraulic valve from the pump/dump tank to the lifting cylinder of the column.

During the lifting or lowering operation, all of the lifts heights are continually monitored to determine if they are staying within a predetermined difference of height. In the event that one or more of the lifting columns does not remain within the predetermined lifting or lowering predetermined parameters the lifting or lowering operation is halted by the offending unit issuing a stop to the lift or lower operation. This unit is now the lead unit. The operator is given notice of the problem and is asked to go to the unit and manually bring the unit to within lifting or lowering difference specifications. Once the operator goes to the offending column and performs a manual re-synchronization on the offending column the ensemble lift or lower may be resumed by any of the columns operator consoles. This process is called resynchronization of the lift ensemble. The problem is broadcast by way of the common communication buffer so all of the units in the ensemble are on notice of the problem and it appears on all display consoles of the lifting ensemble.

The re-synchronization is usually not necessary except in very unusual lifting or lowering operations as the adaptive gain of the family of control processors works to prevent lift synchronization error. The error should only occur when the difference lifting weight is so extreme that the bandwidth of the adaptable gain is not sufficient to accommodate the lift or lower. This would be the case in the event that the lifted vehicle radically changed weight during a lift or lower operation.

A lift or lower may be accomplished from any of the columns in the lifting ensemble. Once a lift or lower is initiated on a column this column declares itself the command column and no other column can be used for controlling the lift ensemble until the lifting or lowering operation is complete by the command column. Once the operation is complete any of the columns can now become the command column and thus initiate a lifting or lowering operation or any other command of the system. The only event that can remove control from a command column during a lifting or lowering operation is the issue of an emergency stop from any other column. The emergency stop sets the stopping column as lead and control column and remains as such until the stop is cleared at the column.

Figure 9:
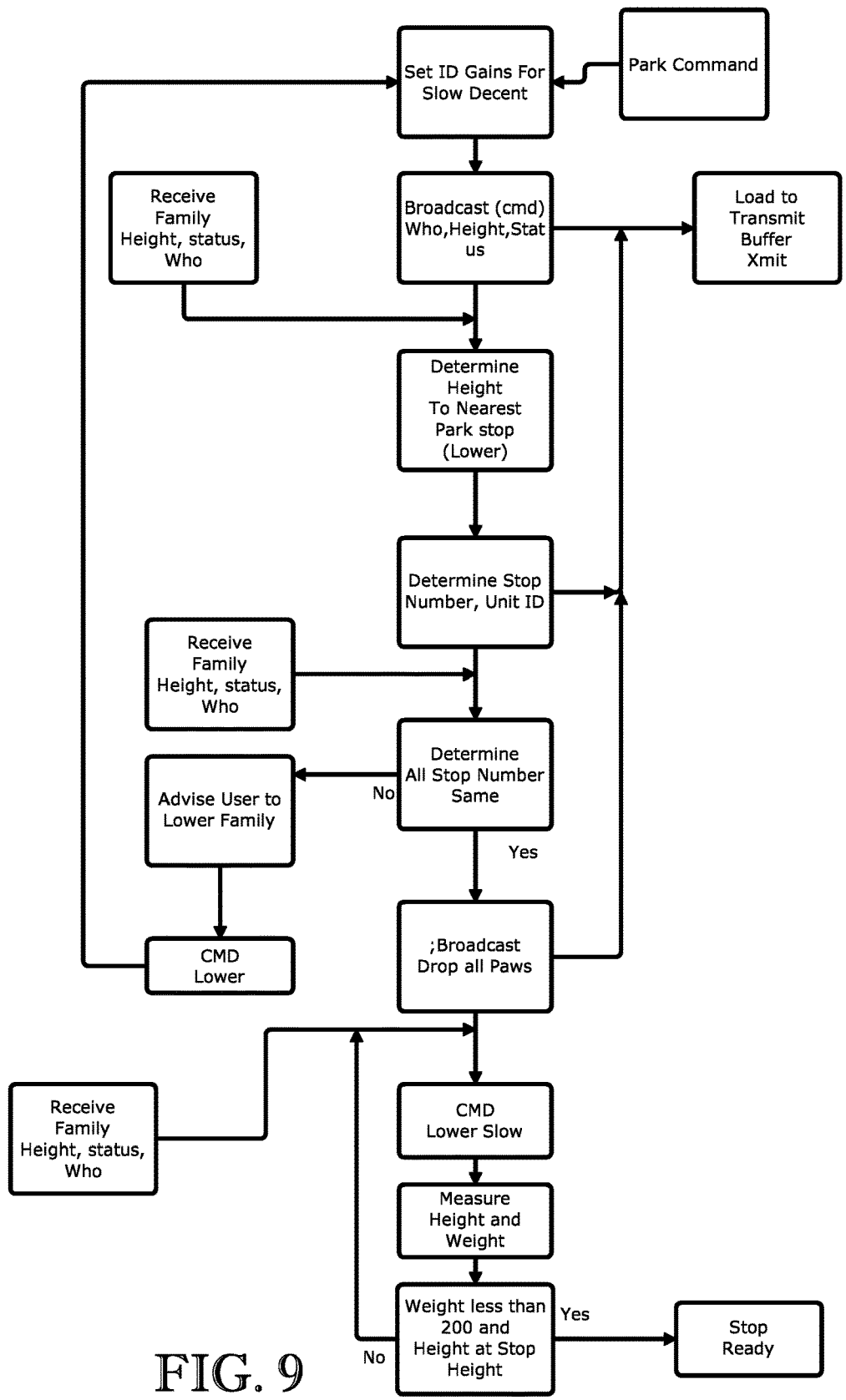
FIG. 9 is a flow diagram showing steps involved in parking a wireless portable lift system.

FIG. 9 provides a flow diagram outlining steps involved in parking a wireless portable lift system configured in accordance with certain embodiments of the present invention. The park operation is used as a way to transfer the lifted weight of the column system from the hydraulic cylinder to a set of stationary metal stops when the lift is used a single height for a prolonged period of time. It is also used to provide the user of the lifting system with an additional margin of safety when working under the vehicle on the column lift system as the weight supported by a set of metal stops on the lifting column as opposed to the hydraulic lifting cylinder. In the park mode of operation the hydraulic lift mechanism lowers the weight of the vehicle on to the nearest set of mechanical stops and locks the stops into position to assure no movement up or down of the vehicle being lifted.

When the park command is executed by the operator the command is placed in the common command data buffer and the command is then sent to all of the command buffers in the lifting ensemble. The height of the column lift is compared with all other lifts to assure that the lifting system is in sync and all lifts are within a predetermined height. The lifts height is compared to the heights of the fixed stops that are on each of the steel columns. If there is a metal stop below the current position of the lift then the control processor will verify that the same condition exists for all of the lifts through the common communication buffer. If all heights are the same and all target stops are the same the gain of the lower command is set very low. The weight of the vehicle is determined and stored. The parking paws are released and set to engage the designated stop. The lower command is given to all lifts through the common communication buffer. The weight supported by the hydraulic system is monitored and the vehicle is lowered until weight is removed from the hydraulic system. When the predetermined weight remains on the hydraulic system the lowering is halted. All units report to each other on the common communication bus that the park has been accomplished and the operator is given a park indication on the operator's console. In the event that weight has not been removed from all of the hydraulic systems the control processor will enter an error mode indicating that one or more of the parking paws has failed and a park is not possible and the unit halts. The operator is then asked to intervene and check the system for a mechanical fault.

If the park command is issued by the operator and the lift happens to be on one of the metal stops or if any of the positions of the lifts are ambiguous with respect to the position of the metal stops, the park command will not be executed and the operator is asked to raise or lower the lift system until the ambiguity can be resolved. This is done to assure that the metal parking paws will engage with the metal stops on the columns. The control processors assure that there is a prescribed clearance above each stop before the park can be executed. This prescribed clearance must be met or exceeded before a coordinated park can be executed. The operators console returns to the command mode.

Figure 10:
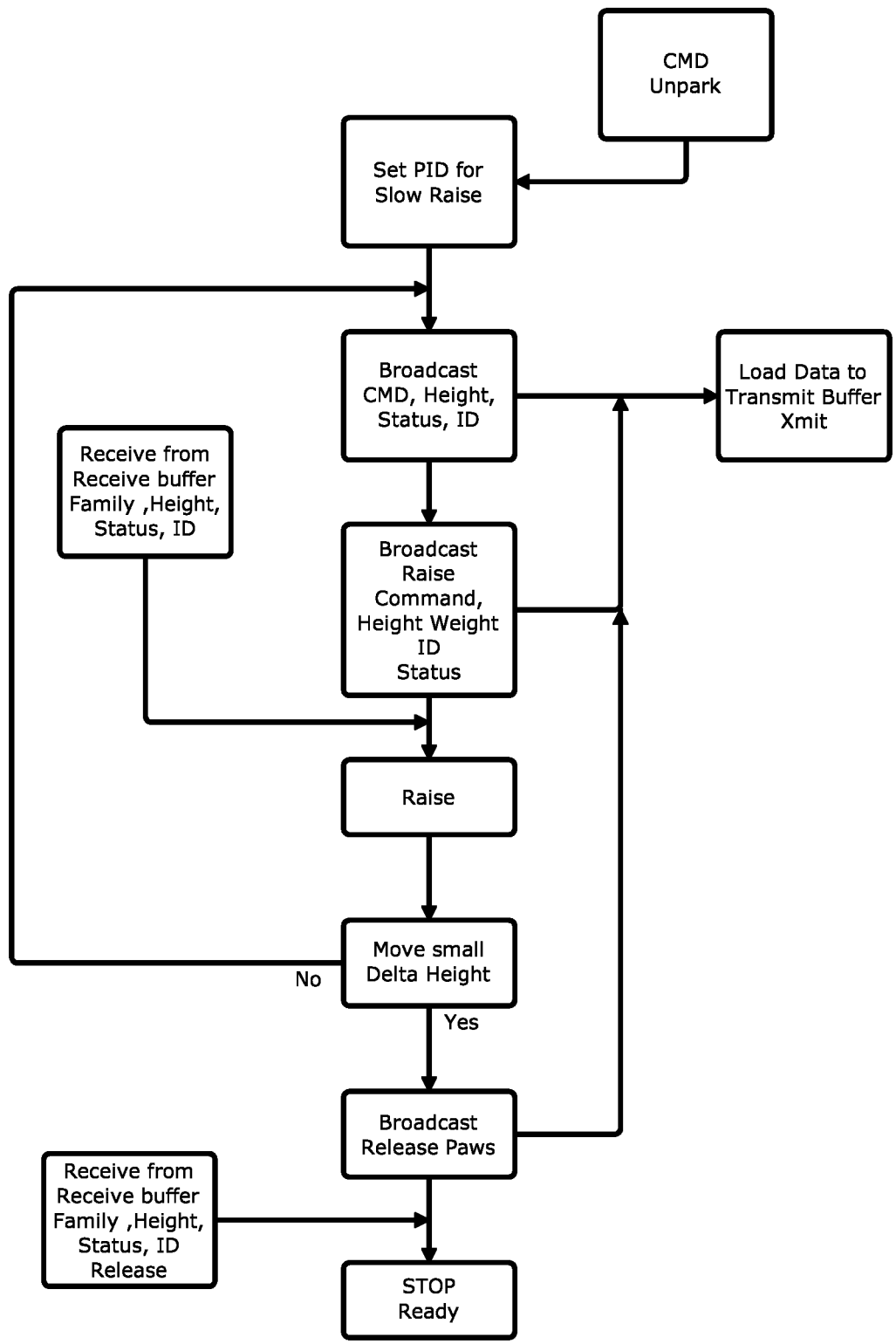
FIG. 10 is a flow diagram showing steps involved in un-parking a wireless portable lift system.

FIG. 10 provides a flow diagram outlining steps involved in un-parking a wireless portable lift system configured in accordance with certain embodiments of the present invention. The un-park operation is used to return the column lift system from the park or column weight supported mode to a hydraulic weight supported mode so that the vehicle can be lifted or lowered. The un-park command is issued by the operator from any of the columns operator consoles. On a un-park common command buffer is loaded and sent to all of the columns. If the ensemble is complete and no stops exist the gain of the lifting PWM will be adjusted to a prescribed value, and the command will be given to lift the vehicle a prescribed amount. The individual weights will be monitored and when the derivative of the weight is zero for all of the columns during the lift sequence, and the columns are raised an additional prescribed amount to assure clearance of the stops, the un-park is said to be successful. The parking paws are retracted on all lifts and verified, and the lift is returned to the lifting and lowering mode of operation, or the command mode. The un-park can be accomplished from any of the column lift consoles like the park can be accomplished from any of the column lift consoles.

Figure 11:
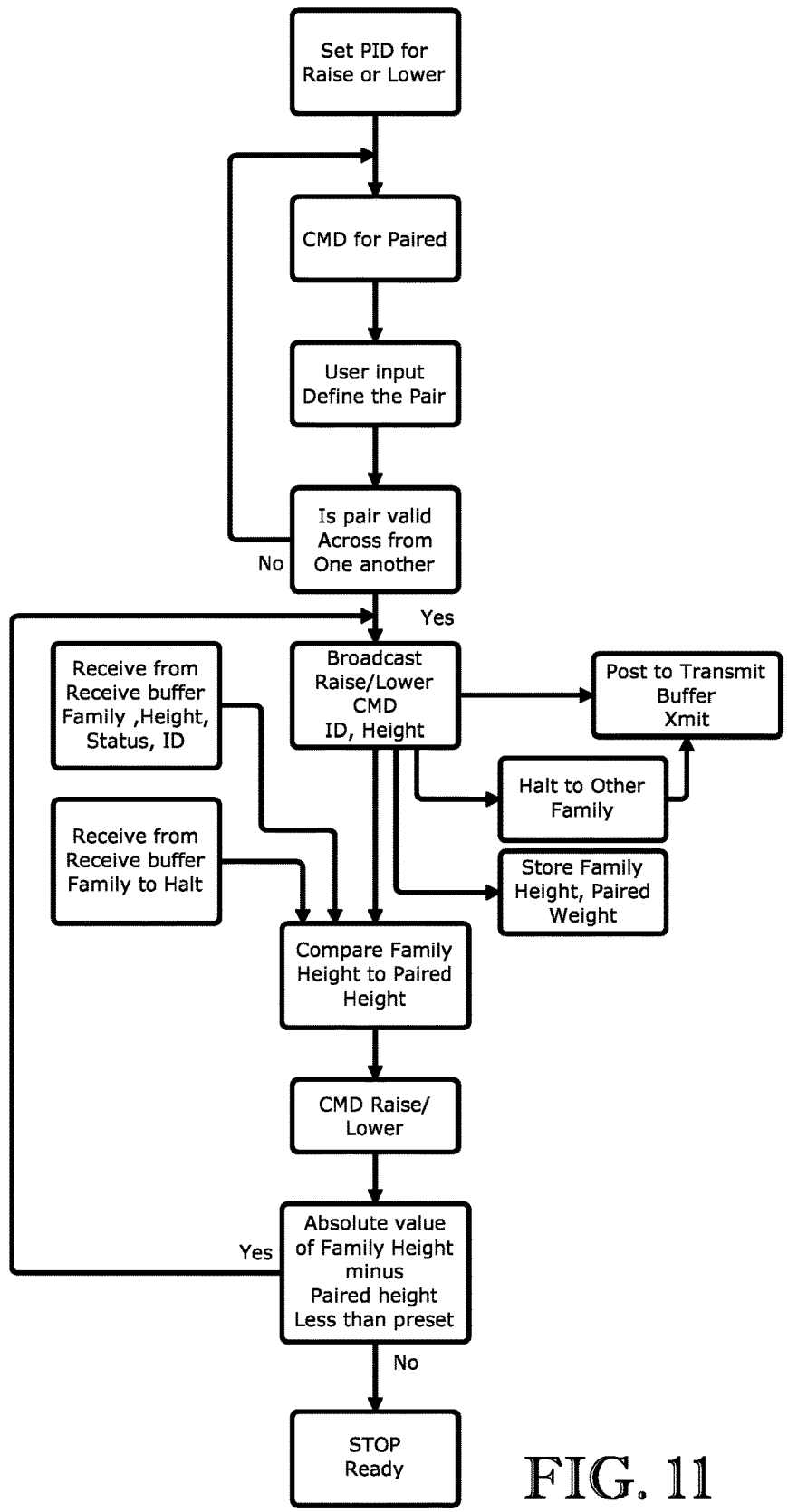
FIG. 11 is a flow diagram showing steps involved in operating a wireless portable lift system in a paired mode.

FIG. 11 provides a flow diagram outlining steps involved in operating a wireless portable lift system in a paired mode. The paired operation is used to allow the lift system to move any two of the lift columns of a lift ensemble and operate them independently of the other lifts in the ensemble. During this time other columns in the lift system are locked out from moving unless an E-stop occurs. It is recommended that the paired lifts be assigned to positions opposite each other on either side of the vehicle under lift. The control processors using the intelligent communications processors of the lifting system will verify that the two lifts that have been operator assigned as paired lifts have assigned positions opposite each other in the lifting ensemble. In the event that the two columns do not have opposite positions in the ensemble the control processors will prevent the unit from entering the paired operation. This aspect is to provide a margin of safety for the operator during an asymmetric lift operation.

Once the operator has selected a valid pair of lifts to be independently operated, the system will lock all other lifting columns in the ensemble. The communication processor will update all command buffers, post all column heights to the common data buffer and set a low raise/lower PID control gain in each of the paired columns that have been selected. The paired set may be operated from either of the paired columns operator consoles. The unit will now allow the operator to operate the paired lifts up or down and allow the raise/lower movement as long as the difference in height of the paired group is within a prescribed distance from the height of the remainder of the lifting columns. This is done to provide a margin of safety to the operator and the vehicle under lift during an asymmetric lifting operation. The units may be parked in any position within the predetermined range of operation. The units will remain in the paired operation until the operator executes an un-pair operation from the operator's console of the two selected lifts.

Figure 12:
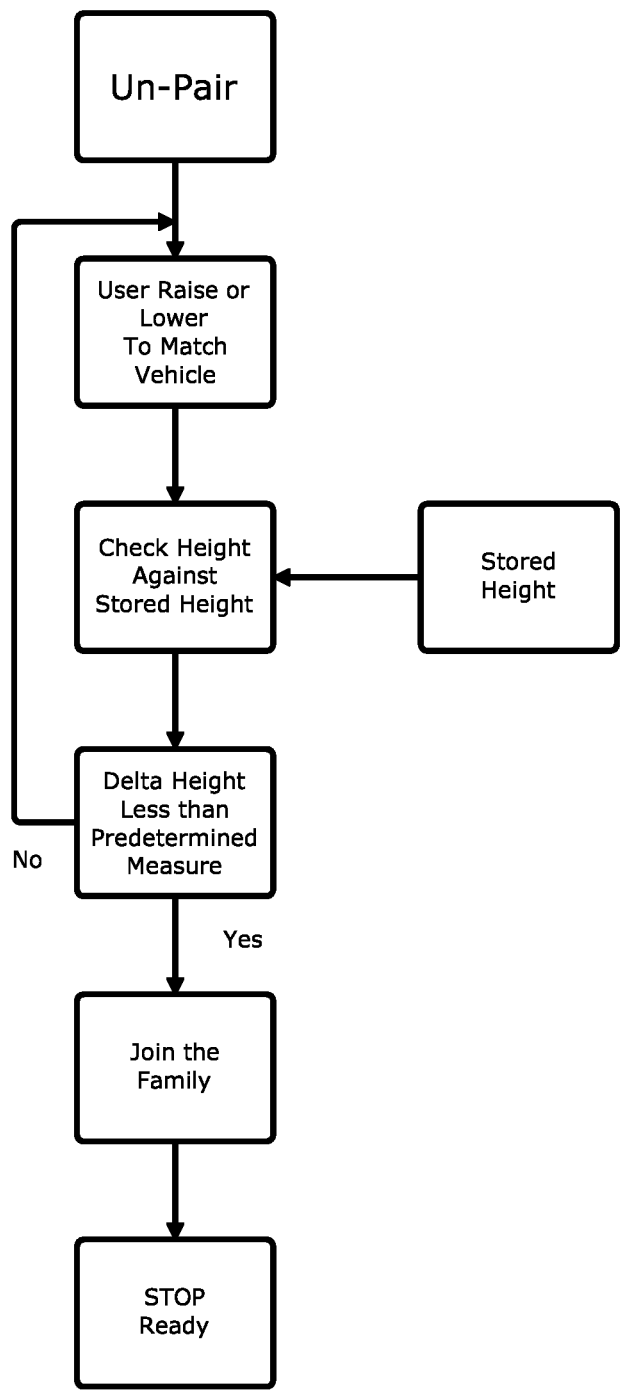
FIG. 12 is a flow diagram showing steps involved in un-pairing a wireless portable lift system.

FIG. 12 provides a flow diagram outlining steps involved un-pairing a wireless portable lift system configured in accordance with certain embodiments of the present invention. The un-pair operation is used to return a lifting ensemble from the paired operation and return the ensemble to its full coordinated column lifting mode. The un-pair command can be given from either of the paired column's operator console. Once the command is given the control processors of the paired columns recall the height of the rest of the ensemble and compare it to the current height of the two paired columns. The processor will then issue a small PID raise/lower gain to the control program, the processor will then place on the common data bus for the paired units gains, destination weights, and heights, and using the communication processors perform a coordinated move the columns in a direction that will make the paired column assume the height of the rest of the ensemble. This move is executed by the raise/lower portion of the control programs in each of the lifts. During this lower or lift, the lift weight of each of the rejoining columns is monitored to assure that the column does not assume a dominant or slacker weight of the columns in the ensemble, but will assume its divided share of the weight. Once the predetermined heights and weights are reached the ensemble is returned to the full ensemble mode with all columns assuming equal partnership.

Figure 13:
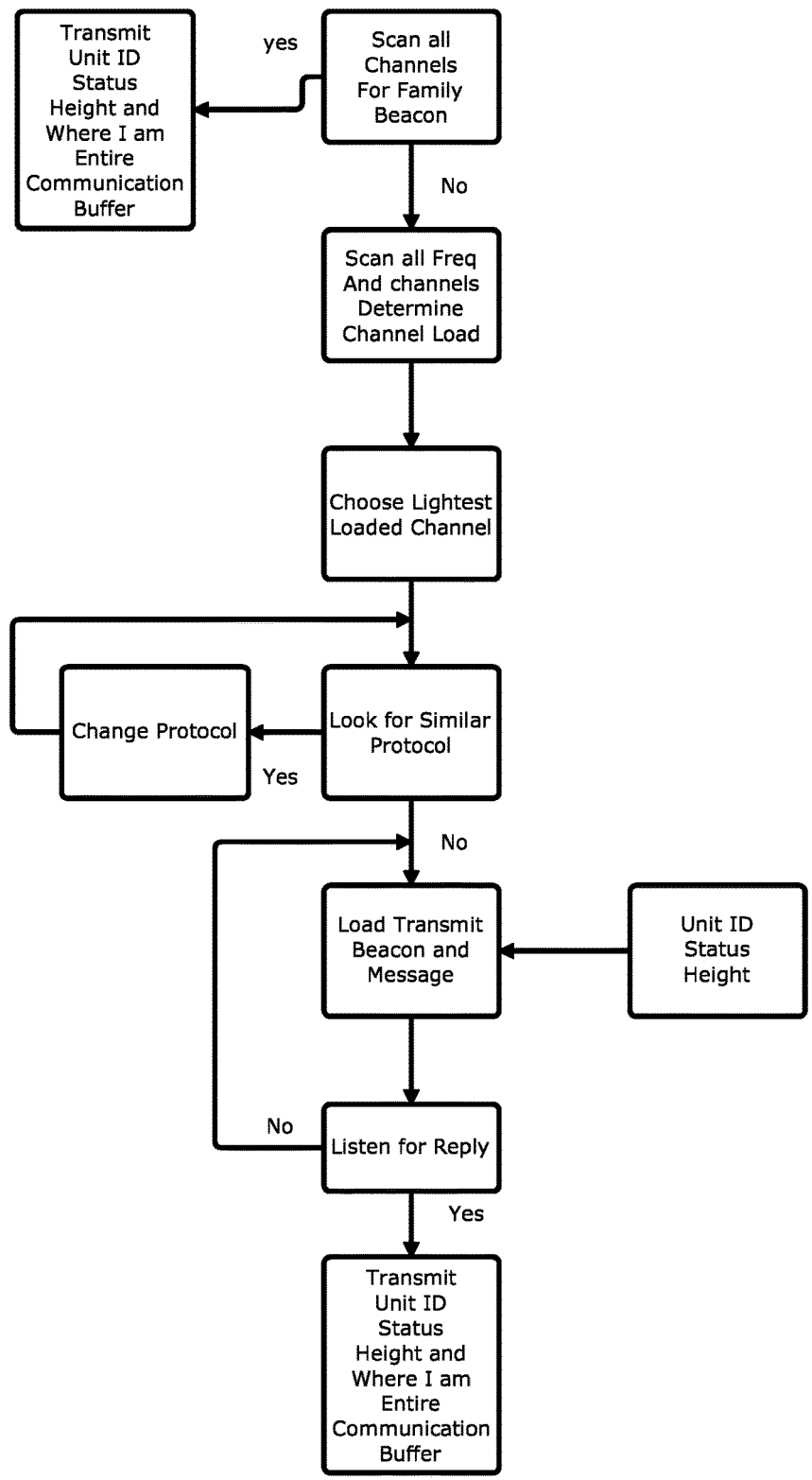
FIG. 13 is a flow diagram showing steps involved in operating an adaptive communication system of a wireless portable lift system.

FIG. 13 provides a flow diagram outlining steps involved in operating an adaptive communication system of a wireless portable lift system configured in accordance with certain embodiments of the present invention. The adaptive communication system in each of the column lifts provides communication of all command and control information and in addition provides for a continuous synchronous updating of a common data buffer in each of the lifts. The common data buffer is in the same form in all of the lift systems as no lifting system is either a master or slave. Each common data buffer in each lift contains the status and operation of all lifts in the ensemble. This common data buffer is maintained in the control processor of each column lift in the working ensemble. The data buffer contains, communication channel data, frequency data, and current protocol data, all column weights, heights, operational and health status of all lifts, assigned lift positions of all lifts, current mode of operation of all lifts, and a current roll call of all lifts in the ensemble, the buffer also contains security information or encryption data needed to interpret all lift communication and to validate command data. The buffer also contains whether there are other lifts, not in the ensemble, in the working vicinity and whether they are joined in an ensemble.

The command data buffer is continually kept up to date by the poling of all of the ensemble columns by the first unit in the ensemble. (The first unit is defined as the first unit powered up or the beacon unit. This unit can be any of the columns. The only requirement is that it is the first unit powered up.) Any unit can initiate the pole of all units. The poling is an asked and answered protocol followed by all data on the member of an ensemble. This reply is heard by all columns and logged in each column. The data is sent in an encrypted form with parity, and a cyclic redundancy check (CRC) to insure security. The roll call contains multiple calls and requests and retries to insure valid data and provide for data collision reduction. In the event that a column is absent from the roll call or a roll call ceases for a predetermined length of time, the ensemble goes into an error mode with the loss of a column. If the unit returns the error code is removed and normal operation is resumed.

If the communication processor is the first column to come on line, the communication processor assumes the polling task. The communication processor with the polling task assumes the task of determining the clearest channel that is to be used by the ensemble for all data and determines the hop sequence based on the assessment of channel activity at the time of power up. The polling processor also is responsible for the periodic assessment of the RF environment in order to keep the used channels as clear as possible. This process is initiated when excessive communication errors are detected on one or more of the column's data. This communication processor is responsible for establishing the encryption key that will be used by the formed ensemble. All of this channel data is placed on the beacon so that joining columns can adjust their communication processors accordingly. The polling processor will maintain the beacon until all of the units that are to be joined have been acquired. Once all units are joined the secure communication occurs to all columns in the form of an asked and answer on the secure channels and designated encryption key. This roll call and movement of the common data buffers continues until the ensemble is dissolved. The communication processor is frequency agile, encryption key agile, protocol agile. All communication processors are the same and can assume the polling task if they are the first that are powered up of an ensemble.

Figure 14:
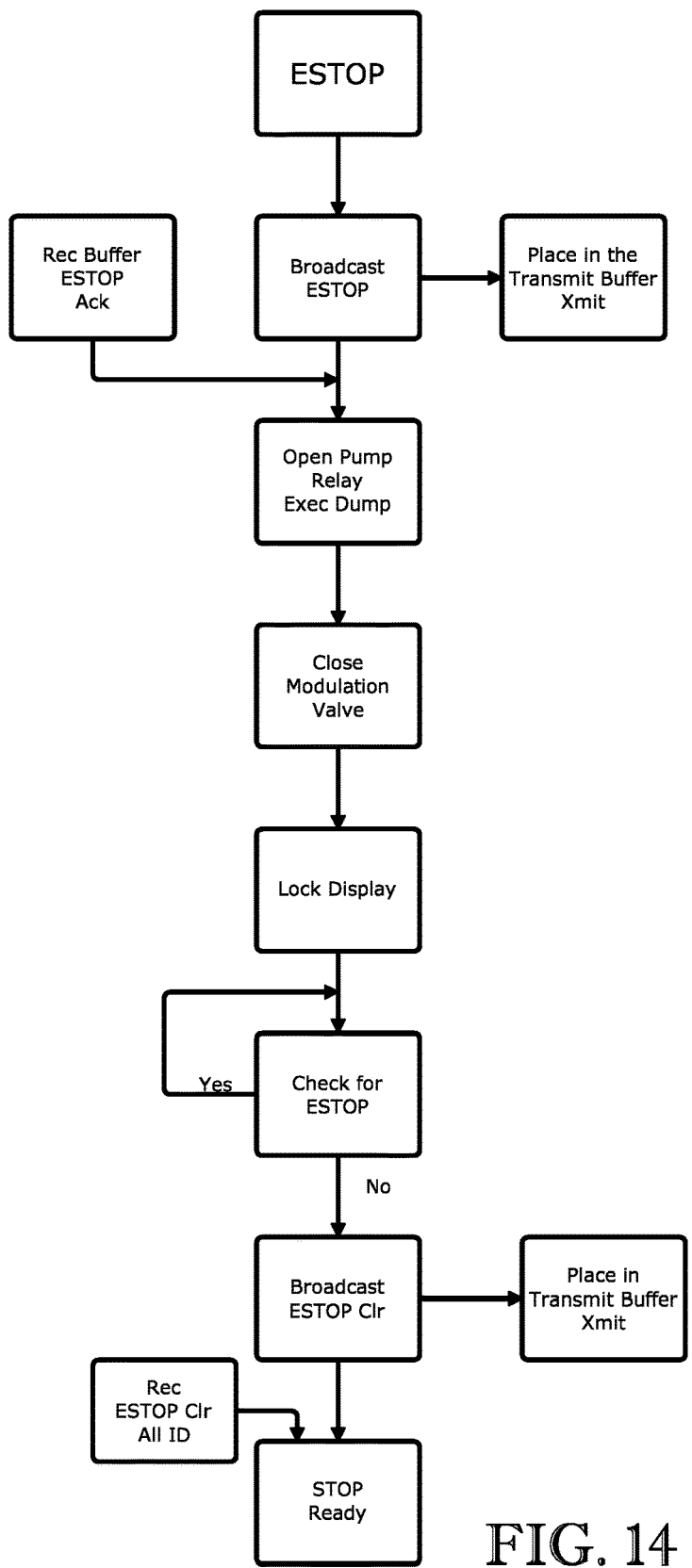
FIG. 14 is a flow diagram showing the steps involved in executing an emergency stop for a wireless portable lift system.

FIG. 14 provides a flow diagram outlining steps involved in operating an E-stop system of a wireless portable lift system configured in accordance with certain embodiments of the present invention. The E-stop is an overriding system interrupt. The E-stop performs two operations. First the E-stop removes power from all of the MOSFETS that drive the pump and valves of the unit where the E-stop is executed. This action causes the dump valve to open and the output of the pump to be jettisoned to the dump tank. The dump valve is executed in the event of the failure of the main power contactor in the ON position. The E-stop assures that the hydraulic circuit is broken thus assuring a positive stop to the hydraulic circuit. This action assures that the unit where the local E-stop is pressed comes to a positive halt. Second the E-stop alerts the control processor of the condition, places the E-stop message in the common communication buffer and the intelligent communications processor broadcasts an E-stop message so all other lift columns are also sent into the E-stop mode as well. The broadcast E-stop message causes a termination of power to the active hydraulic components of all of the members of the ensemble. The E-stopped unit now becomes the command and the lead unit for purposes of control of the column lift ensemble. In the event of a communication and control buffer failure the column will offending column lift will exhibit a communication failure causing all columns go into a failure to sync and halt all motion. In the event of the failure of or locking of any of the control processors the separate COP WATCHDOG processor in the effected column will perform a cold reset of the processor causing a loss of ensemble communication thus causing the entire ensemble to halt. There are three levels of emergency stop. A controlled stop under processor control, a stop by the issuing of the halt command in the common communication buffer thus causing the entire ensemble to halt, and a COP WATCHDOG system reset resulting in loss of system sync and halting of the entire ensemble. If the later occurs, this failure requires the E-stop to be cleared and the system to be restarted from scratch. If the first occurs the E-stop can be cleared by resetting the E-stop button and the ensemble will continue with the lift operations.

The E-stop is designed to be a positive halt to the column lift system. The same result as a cop watchdog stop can be obtained if the operator turns the main power switch off on any one of the ensemble. The ensemble has to restart from scratch. A cop watchdog and a power down is an absolute halt of the column lift system requiring operator intervention.

FIGS. 15-18 provide simplified representations of wireless portable lift system configurations within which one or more of the inventive features discussed above can be implemented. Although each of the lift systems depicted in FIGS. 15-18 show four lifts, it should be understood than any number of lifts can be used.

Figure 15:
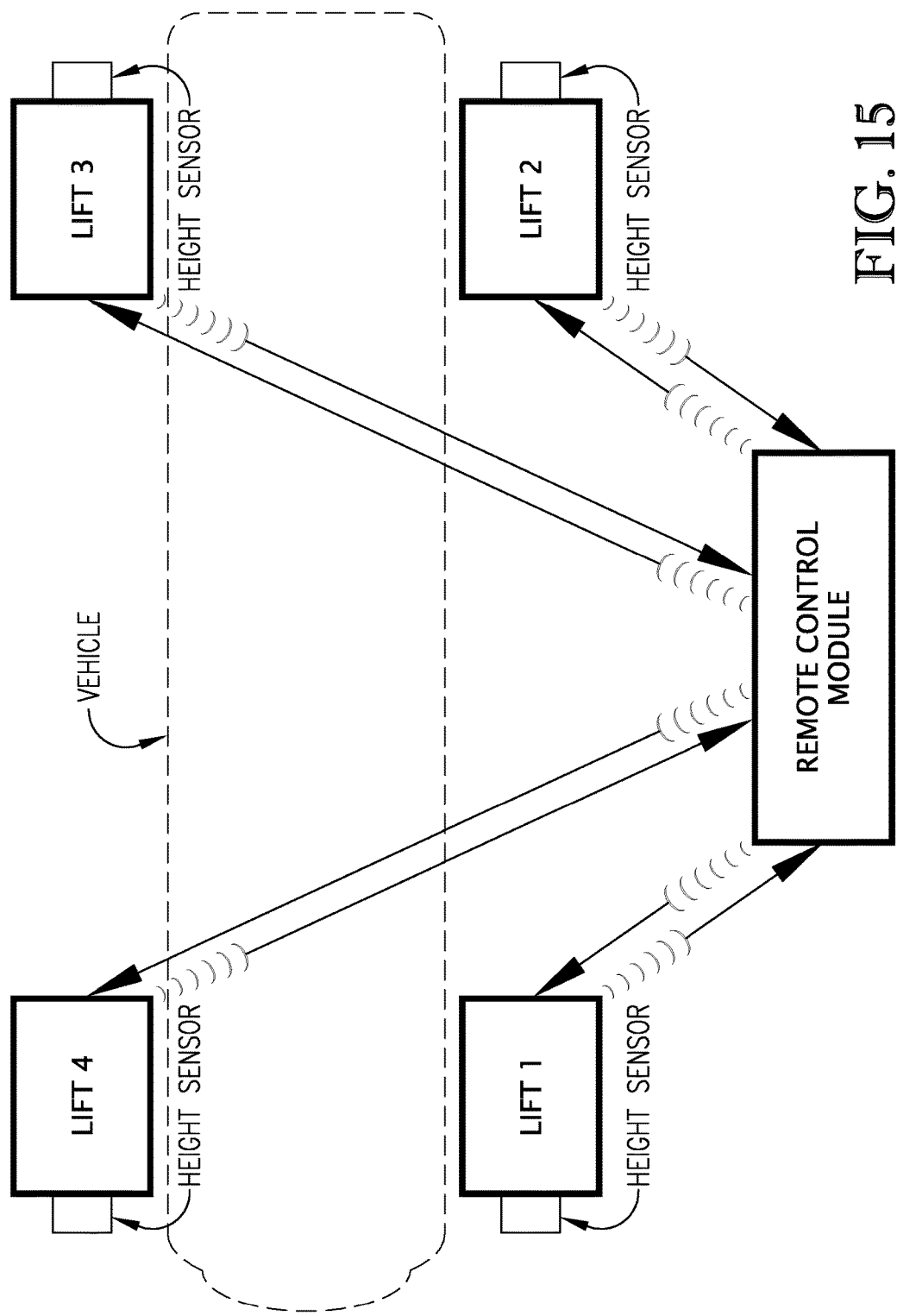
FIG. 15 is a simplified representation of a wireless portable lift system employing a remote control module for wirelessly communication with individual lifts of the system.

FIG. 15 depicts a wireless portable lift system utilizing a remote control module that provides two-way wireless communication with each individual lift of the system. In the embodiment depicted in FIG. 15, the individual lifts only communicate with one another via the remote control module. As such, direct lift-to-lift two-way wireless communication need not be used during operation of the lift system. Each lift of the system can include a height sensor so that the information wirelessly communicated between the lifts and the remote control module can include information regarding the height of the carriage assembly of each lift. The remote control module employed in the system of FIG. 15 can be configured in the manner describe above with reference to FIGS. 1-4.

Figure 16:
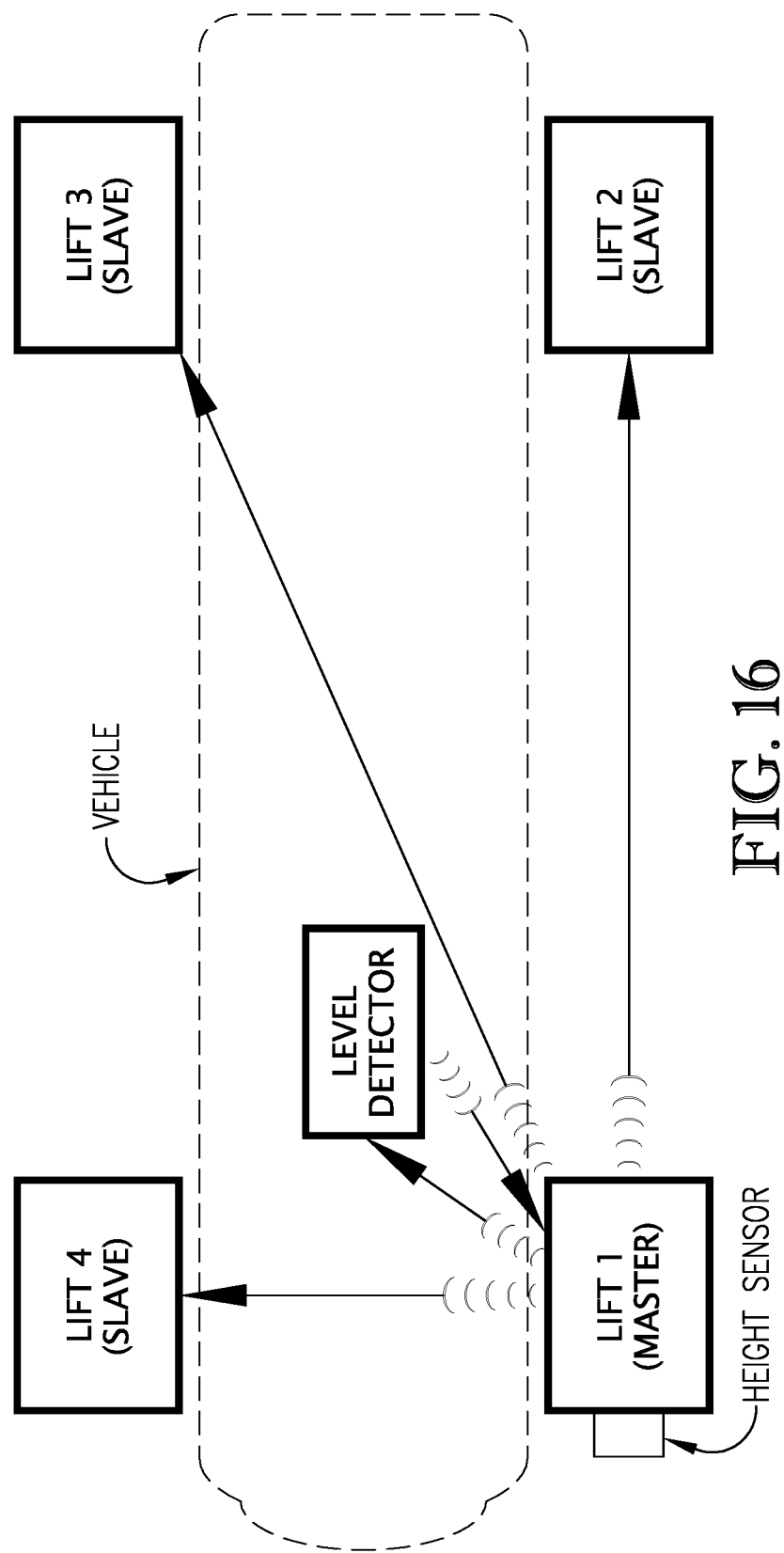
FIG. 16 is a simplified representation of a wireless portable lift system employing a level detector that can be attached to the vehicle and can communicate vehicle level information to one or more of the lifts.

FIG. 16 depicts a wireless portable lift system utilizing a remote level sensor located on a vehicle as the vehicle is being raised and lowered. The level sensor can be used to gather and wirelessly transmit information regarding the level condition of the vehicle. In the embodiment depicted in FIG. 16, the level detector only communicates with a master lift having a height sensor. Using height information gathered from the height sensor on the master lift and level information gathered from the remote level sensor, the master lift can determine the height of all the slave lifts. In such a configuration, it may not be necessary for the lifts to employ two-way communication with one another. Rather, the master lift can communicate instructions to the slave lifts without receiving feedback from the slave lifts, while still ensuring that the vehicle being lifted is not undesirably out of level.

Figure 17:
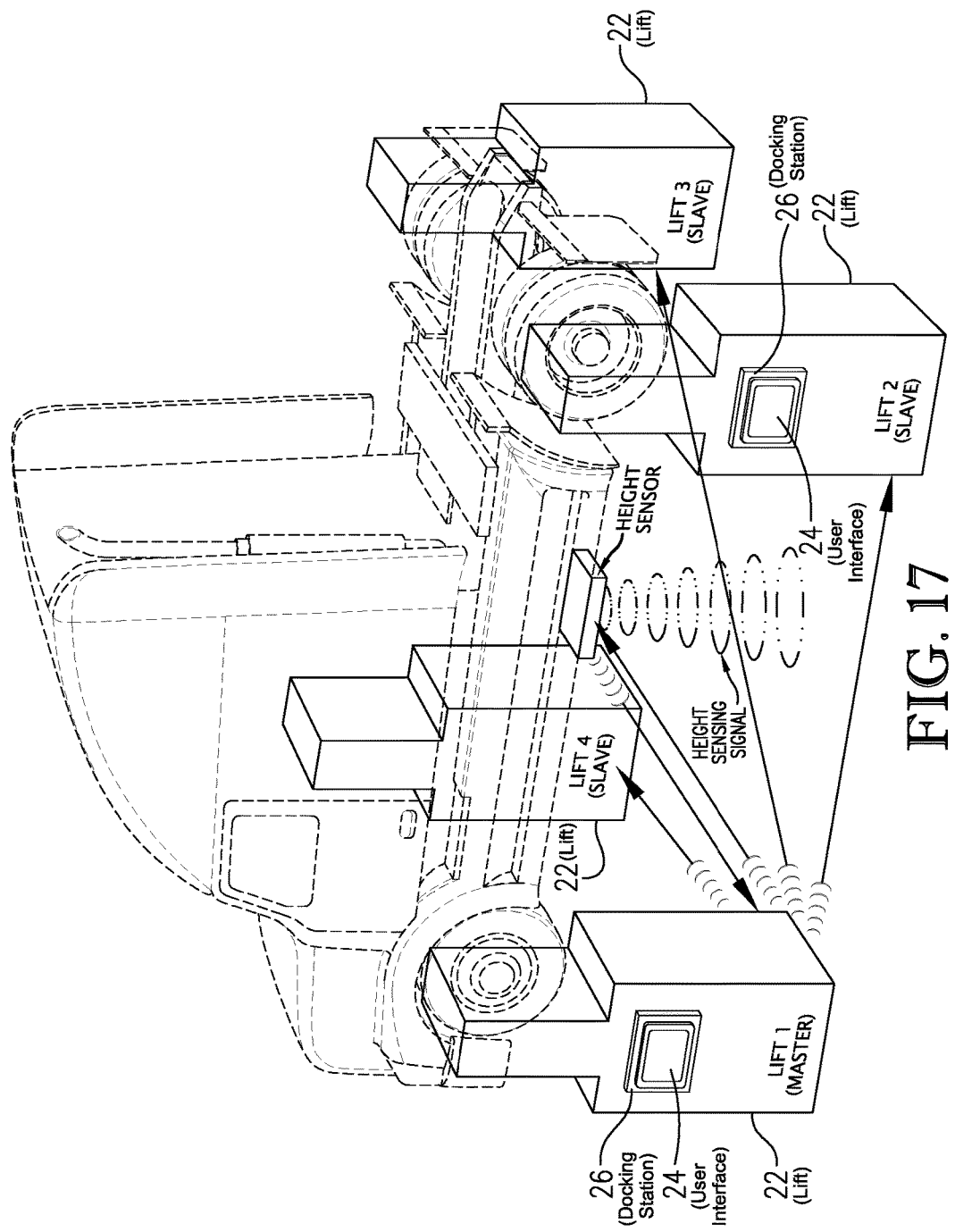
FIG. 17 is a simplified representation of a wireless portable lift system employing a height detector that can be attached to the vehicle and can communicate vehicle height information to one or more of the lifts.

FIG. 17 depicts a wireless portable lift system utilizing a remote height sensor located on a vehicle as the vehicle is being raised and lowered. The remote height sensor can be used to gather and wirelessly transmit information regarding the height of the vehicle to a master lift. In certain embodiments, the remote height sensor can be a directional height sensor that also gathers information regarding the level condition of the vehicle. In such an embodiment, the height detector need only communicate with the master lift. Using height and level information from the height detector, the master lift can determine the height of all the lifts. In such a configuration, it may not be necessary for the lifts to employ two-way communication with one another. Rather, the master lift can communicate instructions to the slave lifts without receiving feedback from the slave lifts, while still ensuring that the vehicle being lifted is not undesirably out of level.

Figure 18:
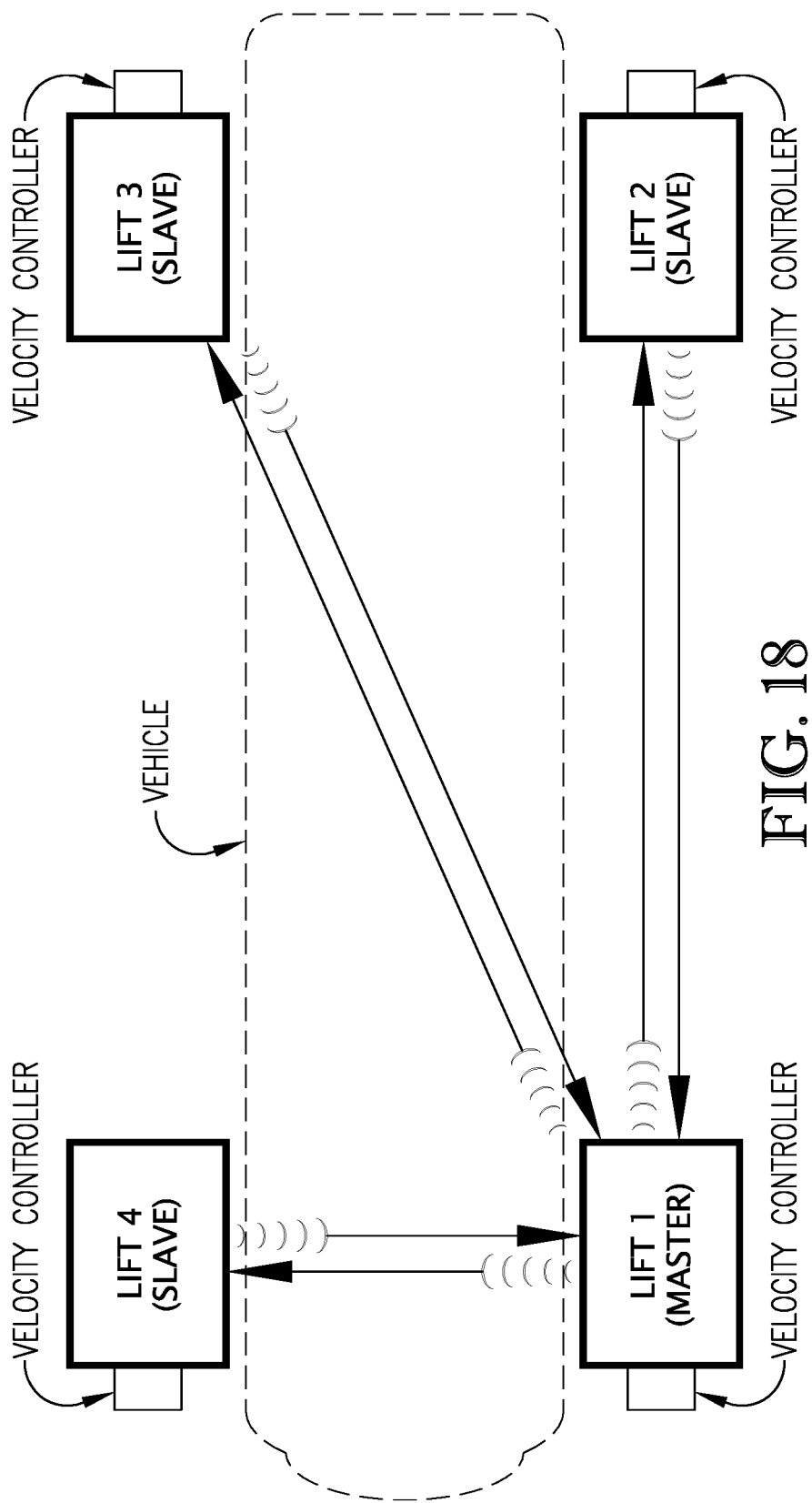
FIG. 18 is a simplified representation of a wireless portable lift system employing lift velocity controllers at each lift to ensure that the lifted vehicle remains substantially level during lifting.

FIG. 18 depicts a wireless portable lift system utilizing velocity controllers, rather than height sensors, to ensure that the vehicle is maintained in a substantially level condition during raising and lowering. In such an embodiment, it is not necessary for height signals to be communicated between lifts. Rather, each lift is set to only operate within a certain narrow velocity range, so that the relative heights of the lifts stay within a certain narrow range. Such a velocity controller can be used instead of height sensors or in conjunction with height sensors to ensure proper leveling of the vehicle during lifting.

It is to be understood that while certain forms of the present invention have been illustrated and described herein, it is not to be limited to the specific forms or arrangement of parts described and shown.

The invention claimed is:
1. A wireless mobile column lift system comprising:
   at least two portable lifts, wherein each of said lifts includes—
      a base for supporting said lift on a floor or the ground,
      a post rigidly coupled to said base and extending upwardly therefrom,
      a carriage assembly configured to engage a wheel of a vehicle, wherein said carriage assembly is coupled to said post and configured for vertical shifting relative to said post,
      a lift actuator for raising and lowering said carriage assembly relative to said post, and
      one or more batteries configured to provide power for said lift; and
   an electronic control system for controlling said lift system, wherein said electronic control system includes—
      a wireless communication system configured to provide wireless communication among said lifts in said lift system, and
      a user interface associated with each of said lifts, wherein said user interface on each of said lifts comprises a touch screen display,
   wherein said electronic control system is configured to provide continuous wireless communication between each of said lifts and every other one of said lifts in said lift system, wherein said electronic control system is configured to permit all of said lifts to be controlled via a single user interface located on one of said lifts, wherein said electronic control system is configured to track and/or store lift data relevant to safety, maintenance, and/or proper operation of said lift system, wherein said electronic control system is configured to provide a notification of maintenance needs base on said lift data, wherein said wireless communication system is configured to automatically scan communication frequencies and select a frequency with minimal noise, wherein said user interface further comprises one or more function buttons separate from the touch screen display, wherein said touch screen display is configured to display a real time animation of the position of said lifts during lifting and lowering, wherein said touch screen display is configured to display a height of one or more of said lifts, wherein said touch screen display is configured to display a weight supported by one or more of said lifts, wherein said touch screen display is configured to display a battery status of one or more of said lifts.

2. The wireless mobile column lift system of claim 1, wherein said wireless communication system is configured to scan said communication frequencies on a continual basis.

3. The wireless mobile column lift system of claim 1, wherein said electronic control system is configured such that during operation of said lift system each lift contains up to date information about the status and lift parameters of all lifts in said lift system.

4. The wireless mobile column lift system of claim 1, wherein said electronic control system includes a common data buffer in each of said lifts, wherein said electronic control system is configured to keep said common data buffer up to date by continually polling all of said lifts in said lift system, wherein said common data buffer contains information concerning the status and operation of each of said lifts in said lift system.

5. The wireless mobile column lift system of claim 1, wherein said electronic control system is configured such that each lift is capable of track its own actions and the actions of all other lifts in said lift system.

6. The wireless mobile column lift system of claim 1, wherein said touch screen display is configured to include a pass code screen that prompts the operator of said lift system to enter a pass code prior to operating said lift system.

7. The wireless mobile column lift system of claim 1, wherein said electronic control system is configured to access a database containing one or more stored authorized pass codes, wherein said electronic control system is configured to render said lift system inoperable if said pass code entered by the operator does not match one of said authorized stored pass codes in said database.

8. The wireless mobile column lift system of claim 7, wherein said database is accessed remotely.

9. The wireless mobile column lift system of claim 1, wherein said touch screen display is configured with a training verification screen that includes an input section for the operator of said lift system to enter information indicating whether the operator has been trained to operate said lift system, wherein said electronic control system is configured to render said lift system inoperable if the operator of said lift system inputs information indicating that the operator has not been trained on said lift system.

10. The wireless mobile column lift system of claim 1, wherein said user interface comprises an emergency stop button.

11. The wireless mobile column lift system of claim 1, wherein said electronic control system is programmed so that movement of said lifts requires operator input from at least one of said function buttons.

12. The wireless mobile column lift system of claim 1, wherein each of said lifts in said lift system has a substantially identical user interface.

13. The wireless mobile column lift system of claim 1, wherein each of said lifts in said lift system is substantially identical.

14. The wireless mobile column lift system of claim 1, wherein said touch screen display on each of said lifts is configured to display at least 80 unique operator interface screens.

15. The wireless mobile column lift system of claim 1, wherein said touch screen display on each of said lifts is configured to display at least 400 different operator interface screens.

16. The wireless mobile column lift system of claim 1, wherein said touch screen display is configured to display a lift height, a lifted weight, and a battery status.

17. The wireless mobile column lift system of claim 1, wherein said electronic control system is configured such that said touch screen display on the lift being used by the operator to control said lift system displays information about all of said lifts in said lift system.

18. The wireless mobile column lift system of claim 1, wherein said electronic control system is configured to display a relative position of all of said lifts on said touch screen of at least one of said lifts.

19. The wireless mobile column lift system of claim 1, wherein each of said lifts comprises a weight sensing mechanism configured to detect the weight supported by said carriage assembly, wherein said electronic control system is configured to detect when a difference in weight lifted by different ones of said lifts exceeds an allowable amount, wherein said electronic control system is configured to automatically re-synchronize said lifts when the difference in weight lifted by different ones of said lifts exceeds an allowable amount.

20. The wireless mobile column lift system of claim 1, wherein said lift comprises a battery charger for recharging said one or more batteries.

21. The wireless mobile column lift system of claim 1, wherein said electronic control system is configured to automatically detect the existence of an unsynchronized condition.

22. The wireless mobile column lift system of claim 21, wherein said touch screen display is configured to provide a visual indication of said unsynchronized condition.

23. The wireless mobile column lift system of claim 1, wherein said electronic control system is configured to allow the operator of said lift system to operate all of said lifts in said lift system, a subgroup of said lifts in said lift system, or a single one of said lifts in said lift system.

24. The wireless mobile column lift system of claim 1, wherein said electronic control system is configured to permit paired operation of a user selected pair of said lifts.

25. The wireless mobile column lift system of claim 1, wherein said electronic control system comprises a velocity controller for controlling the velocity of said lifts within a certain velocity range.

26. The wireless mobile column lift system of claim 25, wherein said electronic control system comprises a velocity sensor, wherein said electronic control system is configured to wirelessly communicate the velocity of each of said lifts.

27. The wireless mobile column lift system of claim 1, wherein said lift system is configured to electronically store lift information relevant to the safety, maintenance, and/or proper operation of said lift system.

28. The wireless mobile column lift system of claim 1, wherein said touch screen display is configured to display instructional information, warning information, and operating information.

29. The wireless mobile column lift system of claim 1, wherein said lift system does not have power cables or control cables.

30. The wireless mobile column lift system of claim 1, wherein each of said lifts comprises a mechanical load holding device, wherein said touch screen display is configured to display information about said mechanical load holding devices.

31. The wireless mobile column lift system of claim 1, wherein each of said lifts comprises stationary metal stops, wherein said electronic control system is configured to execute a park operation by lowering all of said lifts to the nearest set of mechanical stops, wherein said electronic control system is configured to provide the operator of said lift system with an indication that said park operation has been accomplished.

32. The wireless mobile column lift system of claim 1, wherein said electronic control system is configured to provide an audible warning during lowering of said lifts.

33. The wireless mobile column lift system of claim 1, wherein said wireless communication system is configured for operation on a plurality of channels, where said channels can be selected by the user of said lift system.

34. The wireless mobile column lift system of claim 1, wherein said electronic control system is capable of controlling eight or more of said lifts in a coordinated fashion from one of said user interfaces.

35. A wireless mobile column lift system comprising:
at least two portable lifts, wherein each of said lifts includes—
a base for supporting said lift on a floor or the ground,
a post rigidly coupled to said base and extending upwardly therefrom,
a carriage assembly configured to engage a wheel of a vehicle, wherein said carriage assembly is coupled to said post and configured for vertical shifting relative to said post,
a lift actuator for raising and lowering said carriage assembly relative to said post, and
one or more batteries configured to provide power for said lift; and
an electronic control system for controlling said lift system, wherein said electronic control system includes—
a wireless communication system configured to provide wireless communication among said lifts in said lift system, and
a user interface associated with each of said lifts, wherein said user interface on each of said lifts comprises a touch screen display,
wherein said wireless communication system is configured to automatically scan communication frequencies on a continual basis and automatically adjust one or more wireless communication parameters based on the scan of communication frequencies,
wherein said user interface further comprises one or more function buttons separate from said touch screen display and an emergency stop button separate from said touch screen display,
wherein said electronic control system is programmed so that movement of said lifts requires operator input from at least one of said function buttons,
wherein said electronic control system is configured to permit all of said lifts to be controlled via a single user interface located on one of said lifts,
wherein said electronic control system is configured to provide a notification of maintenance needs,
wherein said electronic control system is configured to permit paired operation of a selected pair of said lifts,
wherein said electronic control system is configured such that each of said lifts is capable of tracking its own actions and the actions of all other of said lifts in said lift system,
wherein said touch screen display is configured to prompt the operator of said lift system to enter a pass code prior to operating said lift system, wherein said electronic control system is configured to access a database containing one or more stored authorized pass codes, wherein said electronic control system is configured to render said lift system inoperable if said pass code entered by the operator does not match one of the authorized stored pass codes stored in said database,
wherein said touch screen display is configured to display a real time animation of the position of said lifts during lifting and lowering,
wherein said touch screen display is configured to display the height of one or more of said lifts in said lift system,
wherein said touch screen display is configured to display the weight supported by one or more of said lifts in said lift system,
wherein said touch screen display is configured to display the battery status of one or more of said lifts in said lift system,
wherein each of said lifts comprises a mechanical load holding device, wherein said touch screen display is configured to display information about said mechanical load holding devices,
wherein each of said lifts in said lift system is substantially identical.

36. The wireless mobile column lift system from claim 35, wherein said wireless communication system is configured to select a frequency with minimal noise to thereby maintain integrity and/or security of wireless communications.

37. The wireless mobile column lift system from claim 35, wherein said electronic control system includes a common data buffer in each of said lifts, wherein said electronic control system is configured to keep said common data buffer up to date by continually polling all of said lifts in said lift system, wherein said common data buffer contains information concerning the status and operation of each of said lifts in said lift system.

38. The wireless mobile column lift system from claim 35, wherein said touch screen display on each of said lifts is configured to display at least 400 different operator interface screens.

39. The wireless mobile column lift system from claim 35, wherein said electronic control system is configured to display all available lifts on said touch screen display of at least one of said lifts.

40. The wireless mobile column lift system from claim 35, wherein each of said lifts comprises a weight sensing mechanism configured to detect the weight supported by said carriage assembly, wherein said electronic control system is configured to detect when a difference in weight lifted by different ones of said lifts exceeds an allowable amount, wherein said electronic control system is configured to automatically re-synchronize said lifts when the difference in weight lifted by different ones of said lifts exceeds an allowable amount.

41. The wireless mobile column lift system from claim 35, wherein each of said lifts comprises two of said batteries, wherein each of said lifts comprises a battery charger for recharging said batteries.

42. The wireless mobile column lift system from claim 35, wherein said touch screen display is configured to provide a visual warning if said lifts are out of coordination with one another.

43. The wireless mobile column lift system from claim 35, wherein said electronic control system comprises a velocity controller for controlling the velocity of said lifts within a certain velocity range, wherein said electronic control system comprises a velocity sensor, wherein said electronic control system is configured to wirelessly communicate the velocity of each of said lifts.

44. The wireless mobile column lift system from claim 35, wherein said lift system is configured to electronically store lift information relevant to the safety and proper operation of said lift system.

45. The wireless mobile column lift system from claim 35, wherein said lift system does not have power cables or control cables.

* * * * *